(12) United States Patent
Leddy et al.

(10) Patent No.: US 10,300,453 B2
(45) Date of Patent: May 28, 2019

(54) THIN LAYER SONOCHEMISTRY AND SONOELECTROCHEMISTRY DEVICES AND METHODS

(71) Applicant: University of Iowa Research Foundation, Iowa City, IA (US)

(72) Inventors: Johna Leddy, Iowa City, IA (US); Chester G. Duda, West Liberty, IA (US); Jacob Lyon, Davenport, IA (US); William J. Leddy, III, Lakeway, TX (US)

(*) Notice: Subject to any disclaimer, the term of this patent is extended or adjusted under 35 U.S.C. 154(b) by 579 days.

(21) Appl. No.: 14/515,418

(22) Filed: Oct. 15, 2014

(65) Prior Publication Data

US 2015/0147594 A1 May 28, 2015

Related U.S. Application Data

(60) Provisional application No. 61/891,727, filed on Oct. 16, 2013.

(51) Int. Cl.
*B01J 19/10* (2006.01)
*H01M 8/04* (2016.01)
(Continued)

(52) U.S. Cl.
CPC ............. *B01J 19/10* (2013.01); *B01J 19/087* (2013.01); *H01M 8/04* (2013.01); *H01M 8/0637* (2013.01);
(Continued)

(58) Field of Classification Search
CPC . B01J 19/10; B01J 37/343; B01J 2219/00932
(Continued)

(56) References Cited

U.S. PATENT DOCUMENTS

| 5,426,341 A | 6/1995 | Bory et al. |
| 5,490,810 A | 2/1996 | Hahn et al. |

(Continued)

FOREIGN PATENT DOCUMENTS

| EP | 0594541 A2 | 4/1994 |
| EP | 0645195 A2 | 3/1995 |

(Continued)

OTHER PUBLICATIONS

Duda et al (Thin Layer Sonoelectrochemistry. University of Iowa. May 2012. Thesis).*

(Continued)

*Primary Examiner* — Stephen J Yanchuk
(74) *Attorney, Agent, or Firm* — The Marbury Law Group, PLLC

(57) ABSTRACT

A device which can increase the rates of interfacial reactions including heterogeneous electron transfer reactions, the device comprising at least one sono(electro)chemical cell adapted to hold a thin layer of condensed fluid which is optionally adapted to participate in a heterogeneous electron transfer reaction, wherein the cell is further adapted to provide an ultrasonic transducer face to propagate sound waves into the thin layer of condensed fluid, and wherein the cell is still further adapted with an opening to provide the thin layer of condensed fluid with at least one interface which provides for reflection of the sound waves from the interface back into the thin layer of condensed fluid. The cells are configured to provide for a thin layer operation as opposed to a bulk operation. In method embodiments, ultrasound is applied to the thin layer of condensed fluid. The application of ultrasound is carried out both without cooling of the cell and without pressurization of the cell. Methods of using the device include fuel cells and fuel cell (Continued)

electrodes. Systems having anodes and cathodes are also provided.

19 Claims, 22 Drawing Sheets

(51) Int. Cl.
*H01M 8/0637* (2016.01)
*H01M 8/1011* (2016.01)
*B01J 19/08* (2006.01)
*H01M 8/1018* (2016.01)
*H01M 8/18* (2006.01)
*H01M 4/92* (2006.01)
*H01M 12/06* (2006.01)

(52) U.S. Cl.
CPC ............ *H01M 8/1011* (2013.01); *H01M 4/92* (2013.01); *H01M 8/188* (2013.01); *H01M 12/06* (2013.01); *H01M 2008/1095* (2013.01); *Y02E 60/523* (2013.01); *Y02E 60/566* (2013.01)

(58) Field of Classification Search
USPC .................................................. 422/127, 128
See application file for complete search history.

(56) References Cited

U.S. PATENT DOCUMENTS

| | | | |
|---|---|---|---|
| 5,525,172 | A | 6/1996 | Cadiou |
| 5,709,823 | A | 1/1998 | Hahn |
| 6,332,263 | B1 | 12/2001 | Schmidt et al. |
| 6,413,783 | B1* | 7/2002 | Wohlstadter ....... G01N 33/5302 204/400 |
| 6,673,178 | B2 | 1/2004 | Ellner et al. |
| 6,691,909 | B2 | 2/2004 | Skogsmo et al. |
| 6,776,323 | B2 | 8/2004 | Schmidt |
| 6,966,969 | B2 | 11/2005 | Moulin et al. |
| 7,344,620 | B2 | 3/2008 | Jung |
| 7,482,072 | B2 | 1/2009 | Brooks et al. |
| 7,484,650 | B2 | 2/2009 | Szucher |
| 2002/0074380 | A1 | 6/2002 | Ellner et al. |
| 2002/0158104 | A1 | 10/2002 | Schmidt |
| 2003/0066863 | A1 | 4/2003 | Skogsmo et al. |
| 2004/0005431 | A1 | 1/2004 | Moulin et al. |
| 2004/0050474 | A1 | 3/2004 | Kubik et al. |
| 2004/0151957 | A1 | 8/2004 | Brooks et al. |
| 2005/0139484 | A1 | 6/2005 | Brooks et al. |
| 2005/0247408 | A1 | 11/2005 | Jung |
| 2005/0263520 | A1 | 12/2005 | Szucher |
| 2006/0255091 | A1 | 11/2006 | Reatherford et al. |
| 2008/0028858 | A1 | 2/2008 | Hall et al. |
| 2008/0109007 | A1 | 5/2008 | Schwager et al. |
| 2008/0283411 | A1 | 11/2008 | Eastman et al. |
| 2009/0145774 | A1 | 6/2009 | Farooq et al. |
| 2011/0114496 | A1* | 5/2011 | Dopp ................. H01M 4/8631 205/109 |
| 2012/0058405 | A1 | 3/2012 | Kirchoff et al. |
| 2013/0048506 | A1 | 2/2013 | Chen |
| 2014/0158550 | A1 | 6/2014 | Seth et al. |

FOREIGN PATENT DOCUMENTS

| | | |
|---|---|---|
| EP | 1250996 A2 | 10/2002 |
| EP | 1466709 A2 | 10/2004 |
| EP | 1518662 A1 | 3/2005 |
| EP | 1917925 A1 | 5/2008 |
| EP | 2018951 A2 | 1/2009 |
| WO | WO 90/08028 A1 | 7/1990 |
| WO | WO 91/03211 A1 | 9/1991 |
| WO | WO 00/41873 A1 | 7/2000 |
| WO | WO 01/094099 A1 | 12/2001 |
| WO | WO 03/051612 A1 | 6/2003 |
| WO | WO 2006/018415 A2 | 2/2006 |
| WO | WO 2007/012916 A1 | 2/2007 |
| WO | WO 2007/101424 A1 | 9/2007 |

OTHER PUBLICATIONS

Chen et al (Industrial application of piezoelectric polymer transducers. Meas. Sci. Tech. 6 (1995) 249-267).*
The Daily Iowan. Iowa City. Nov. 29, 2011. p. 6.*
Agra-Gutiérrez et al., "Anodic Stripping Voltammetry at a Hydrodynamic Mercury Electrode Under High Mass Transport Conditions. 2. Experimental Verification of Theory and Implications for Sonovoltammetry", J. Phys. Chem. B, vol. 102, No. 36, (1998) pp. 7028-7032.
Banks, C. E.; Compton, R. G., "Voltammetric Exploration and Applications of Ultrasonic Cavitation", *Chem. Phys. Chem.* (2003), vol. 4, pp. 169-178.
Banks, C. E.; Compton, R. G, "Ultrasonically Enhanced Voltammetric Analysis and Applications: An Overview", *Electroanalysis* (2003), vol. 16, pp. 329-346.
Bloemhof, H., "Note on the relationship of sound pressure and sound intensity", *Applied Acoustics*, vol. 19, issue 3, (1986) pp. 159-166.
Boldyrev,V. V., "Mechanochemistry and sonochemistry" *Ultrasonics Sonochemistry*, vol. 2, (1995) pp. S143-S145.
Breiter, M., "On the nature of reduced carbon dioxide", *Electrochimica Acta*, vol. 12, issue 9, (1967) pp. 1213-1218.
Cartwright, K. V., "Determining the Effective or RMS voltage of various waveforms without calculus", *Technology Interface*, vol. 8, (2007) 20 pgs.
Chadderton, D. V. "Building Services Engineering", (2007); table of contents.
Compton et al., "Dual activation: coupling ultrasound to electrochemistry—an overview", Electrochimica Acta, vol. 42, No. 19, pp. 2919-2927 (1997).
Compton et al., "Electroanalysis at Diamond-Like and Doped-Diamond Electrodes", Electroanalysis, vol. 15, No. 17 (2003), pp. 1349-1363.
Compton et al., "Sonoelectrochemical production of hydrogen peroxide at polished boron-doped diamond electrodes", Chem. Comm. (1998), pp. 1961-1962.
Compton et al., "Sono-electrochemistry: the Oxidation of Bis(cyclopentadienyl)molybdenum Dichloride", J. Chem. Soc. Dalton Trans. (1995) pp. 389-393.
Compton et al., "Sonovoltammetry: Heterogeneous Electron_Transfer Processes with Coupled Ultrasonically Induced Chemical Reaction. The "Sono-EC" Reaction", J. Phys. Chem. vol. 99, (1995), pp. 4211-4214.
Compton et al., "Voltammetry in the Presence of Ultrasound. Sonovoltammetry and Surface Effects", J. Phys. Chem., vol. 98, No. 47, (1994) pp. 12410-12414.
Cooper et al., "Mass Transport in Sonovoltammetry with Evidence of Hydrodynamic Modulation from Ultrasound", *Journal of the Electrochemical Society*, vol. 145, No. 6, (1998) pp. 1994-1999.
Del Campo et al., "High-Frequency sonoelectrochemical processes: mass transport, therman and surface effects induced by cavitation in a 500kHz reactor", *Ultrasonics Sonochemistry*, vol. 6 (1999) pp. 189-197.
Doktycz et al., "Interparticle Collisions Driven by Ultrasound", *Science*, vol. 247, (1990) pp. 1067-1068.
Duda, Chester G., "Thin Layer Sonoelectrochemistry", Ph.D. thesis, University of Iowa, May 2012.
Duda et al., "Thin Layer Sonoelectrochemistry", poster, 2013.
Goh et al., "Educational aspects of sonochemistry: The role of sonochemistry at high school level", *Ultrasonics Sonochemistry*, vol. 3(3), (1996) pp. S209-S214.
Gonzalez-Garcia et al., "Current topics on sonoelectrochemistry", *Ultrasonics*, vol. 50, (2010), pp. 318-322.
Hagan et al., "Comparison of Hydrodynamic Volammetry Implemented by Sonication to a Rotating Disk Electrode", *Analytical Chemistry*, vol. 66, No. 3, (1994) pp. 399-405.

(56) References Cited

OTHER PUBLICATIONS

Hardcastle et al., "Soloelectrochemical and sonochemical effects of cavitation: correlation with interfacial cavitation induced by 20 kHz ultrasound", Ultrasonics Sonochemistry, vol. 7, pp. 7-14 (2000).
Hoffman et al., "Application of Ultrasonic Irradiation for the Degradation of Chemical Contaminants in Water", *Ultrasonics Sonochemistry*, 3 (3), (1996) pp. S163-S172.
Hush, N., "Adiabatic theory of outer sphere electron-transfer reactions in solution", *Transactions of the Faraday Society* (1961), vol. 57, pp. 557-580.
Iwasita, T., "Electrocatalysis of methanol oxidation", *Electrochimica Acta*, vol. 47, (2002) pp. 3663-3674.
Laugier et al., "Ultrasound in gas-liquid systems: Effects on solubility and mass transfer", Ultrasonics Sonochemistry, vol. 15 (2008) pp. 965-972.
Leddy et al., "To Build a Thin Layer Sonoelectrochemical Cell and Electrodes for Low Temperature Direct Reformation Fuel Cells", Presentation Slides, 2014.
Li et al., "Rapid sonocrystallization in the salting-out process", J. of Crystal Growth, vol. 247 (2003) pp. 192-198.
Lindley et al., "Sonochemistry Part 2—Synthetic Applications", *Chem. Soc. Rev.*, vol. 16, (1987) pp. 275-311.
Lorimer et al., "Sonochemistry Part I—the Physical Aspects", *Chem. Soc. Rev.*, vol. 16, (1987) pp. 239-274.
Madigan et al., "Effects of sonication on electrode surfaces and metal particles", *Ultrasonics Sonochemistry*, 3, (1996) pp. S239-S247.
Madigan et al., Measurement of Heterogeneous Electron Transfer Rate Constants for $Fe(H_2O)_6^{2+/3+}$ during Sonication of Suspensions of Alumina Particles, *Anal. Chem.*, vol. 69, No. 1, (1997) pp. 5-15.
Marcus, R. A., "On the Theory of Oxidation—Reduction Reactions Involving Electron Transfer. V. Comparison and Properties of Electrochemical and Chemical Rate Constants", *Journal of Physical Chemistry* (1963), 67, 853-857.
Marcus, R. A., "On the Theory of Electron-Transfer Reactions. VI. Unified Treatment for Homogeneous and Electrode Reactions", *Journal of Chemical Physics* (1965), vol. 43 (2), pp. 679-701.
Marcus, R., "Electron transfer at electrodes and in solution: Comparison of theory and experiment" *Electrochim. Acta* (1968), vol. 13 (5), pp. 995-1004.
Margulis, M. A., "Sonochemistry as a New Apromising Area of High Energy Chemistry", *High Energy Chemistry* (2004), vol. 38, No. 3, 135-142.
Marken, F. et al., "Voltammetry in the presence of ultrasound: can ultrasound modify heterogeneous electron transfer kinetics?", *Journal of Electroanalytical Chemistry*, vol. 395, 335-339 (1995).
Mason, T. J., "Sonochemistry: current uses and future prospects in the chemical and processing industries", *Phil. Trans. R. Soc. Lond. A* (1999), vol. 357, pp. 355-369.
Mason, T. J. , "Sonochemistry and sonoprocessing: the link, the trends and (probably) the future", *Ultrasonics Sonochemistry*, vol. 10, (2003) pp. 176-179.
Miller et al., "Intramolecular Long-Distance Electron Transfer in Radical Anions. The Effects of Free Energy and Solvent on the Reaction Rates", *J. Am. Chem. Soc.* (1984), vol. 106, pp. 3047-3049.
Mott, N. F., "The theory of the formation of protective oxide films on metals.—III", *Trans. Faraday Soc.* (1947), vol. 43, pp. 429-434.

Petersson et al., "Carrier Medium Exchange through Ultrasonic Particle Switching in Microfluidic Channels", *Anal. Chem.*, vol. 77, (2005) pp. 1216-1221.
Riesse et al., "Quantitative Sonochemistry", *Ultrasonics Sonochemistry*, vol. 3, (1996) pp. S147-S151.
Riesz et al., "Free Radical Generation by Ultrasound in Aqueous and Nonaqueous Solutions", *Environmental Health Perspectives*, 64, (1985) pp. 233-252.
Salimi et al., "Ultrasonic effects on the electro-reduction of oxygen at a glassy carbon anthraquinone-modified electrode. The Koutecky-Levich equation applied to insonated electro-catalytic reactions", Phys. Chem. Chem. Phys., vol. 5 (2003) pp. 3988-3993.
Sljukic et al., "Exploration of Stable Sonoelectrocatalysis for the Electrochemical Reduction of Oxygen", Electroanalysis, vol. 17, No. 12, (2005), pp. 1025-1034.
Suslick, K. S., "Sonochemistry", Articles, (1990) pp. 1439-1445; downloaded from www.sciencemag.org.
Suslick, K. S. *The Chemistry and Physical Effects of Ultrasound* 2006, www.scs.uiuc.edu/suslick/britannica, html.
Suslick, et al., "Acoustic cavitation and its chemical consequences", *Phil. Trans. Roy. Soc. A*, vol. 357, (1999) pp. 335-353.
Suslick et al., "Alkane Sonochemistry", *J. Phys.Chem.* (1983), 87, 2299-2301.
Suslick et al., "The Site of Sonochemical Reactions", *IEEE Transactions on Ultrasonics, Ferroelectrics, and Frequency Control* (1986), UFFC-33, 143-147.
Suslick et al., "The Sonochemical Hot Spot", *J. Am. Chem. Soc.* (1986), vol. 108, pp. 5641-5642.
Thompson et al., "Sonochemistry: Science and Engineering", *Ind. Eng. Chem. Res.*, 38(4), (1999) pp. 1215-1249.
Thompson et al., "The rate enhancing effect of ultrasound by inducing supersaturation in a solid-liquid system", Chemical Engineering Science, vol. 55 (2000) pp. 3085-3090.
Truesdale et al., "Sollubility of Oxygen in Water", *Nature*, vol. 173, (1954) pp. 1236.
University of New South Wales; School of Physics, *Acoustic impedance, intensity and power* 2011, http://www.animations.physics.unsw.edu.au/jw/sound-impedance-intensity.htm.
Wadhawan et al., "Biphasic sonoelectrosynthesis. A review", *Pure Appl. Chem.*,73 (12), (2001) pp. 1947-1955.
Wadhawan et al., "Sono-emulsion electrosysthesis: electrode-sensitive Kolbe reactions", Chem. Commun., The Royal Society of Chemistry (2001) pp. 87-88.
Walton et al., Sonovoltammetry at platinum electrode:surface phenomena and mass transport processes, *Journal of Applied Electrochemistry*, vol. 25, (1995) pp. 1083-1090.
Walton, David J., "Sonoelectrochemistry—The application of ultrasound to electrochemical systems", Paper, ARKIVOC (2002) (iii), pp. 198-218.
Whelan, Daniel J., "A review of some physical and chemical factors affecting the attenuation of low frequency sound in seawater", Report: Materials Research Laboratories, Australia (1981).
Wilson, Jr., "The Attenuation of Ultrasonic Waves in Electrolytic Solutions", Phys. Review, vol. 81 (1951) p. 657.
Zhang et al, "Effects of High-Intensity Ultrasound on Glassy Carbon Electrodes", *Analytical Chemistry*, vol. 65, No. 11, (1993) pp. 1552-1558.

\* cited by examiner

FIGURE 9

$$O_{2, absorbed}$$

$$\updownarrow H^+, e$$

$$HO^{\bullet}_{2, absorbed}$$

$$\updownarrow H^+, e$$

$$H_2O_{2, absorbed} \rightleftarrows H_2O_{2, solution}$$

$$\updownarrow$$

$$2HO^{\bullet}_{absorbed}$$

$$\updownarrow 2H^+, 2e$$

$$2H_2O_{absorbed} \rightleftarrows 2H_2O_{solution}$$

THIN LAYER SONOCHEMISTRY AND SONOELECTROCHEMISTRY DEVICES AND METHODS

RELATED APPLICATIONS

This application claims priority to U.S. Provisional Application Ser. No. 61/891,727 filed Oct. 16, 2013 ("Sonoelectrochemistry, Sonoelectrocatalysis, and Ultrasound Heterogeneous Catalysis in a Thin Layer"), which is hereby incorporated by reference in its entirety for all purposes.

FEDERAL FUNDING

This invention was made with government support under grant numbers 0809745 and 1309366 awarded by the National Science Foundation. The government has certain rights in the invention.

BACKGROUND

A need exists to develop better commercial devices and methods to accelerate various reactions including, for example, heterogeneous reactions, oxidation-reduction reactions, and heterogeneous electron transfer reactions. Such improvements would be useful in many electrochemical devices and processes including, for example, operation of fuel cells and batteries, as well as various synthesis and production processes. Also, a need exists to reduce the use of expensive precious metal catalysts and electrodes.

Sonochemistry and use of ultrasound to impact chemical reactions are known fields. See, for example, T. J. Mason, *Sonochemistry: The Uses of Ultrasound in Chemistry*, The Royal Society of Chemistry (1990). Sonochemistry equipment, including ultrasound horns, is described in Lindley et al., *Chem. Soc. Rev.* 1987, 16, 275-311.

While ultrasonic methods have been used in conjunction with electrochemical systems to create sonoelectrochemical systems, the results have often been difficult to interpret, and commercialization of the sonoelectrochemical devices and processes have been limited despite interest. See Gonzalez-Garcia et al., *Ultrasonics*, 50, 2010, 318-322. Ultrasound technology could be useful for both electroanalytic and electrosynthetic processes. In many cases, use of high power ultrasound is stressed. Sonoelectrochemical cells have been described. For example, a 500 kHz sonoelectrochemical cell is described in Del Campo et al., *Ultrasonics Sonochemistry* 6 (1999) 189-197 (FIG. 1). See also, generally, US Pat. Pubs. 2005/0139484; 2008/0283411; 2008/0028858; 2012/0058405; 2013/0048506; and 2014/0158550.

SUMMARY

Embodiments described herein include devices and systems, methods of making devices and systems, and methods of using devices and systems.

In a first aspect, the device comprises: at least one sonochemical cell adapted to hold a thin layer of condensed fluid, wherein the cell is further adapted to provide an ultrasonic transducer, optionally an ultrasonic transducer face, to propagate sound waves into the thin layer of condensed fluid, and wherein the cell is still further adapted with an opening to provide the thin layer of condensed fluid with at least one interface which provides for reflection of the sound waves from the interface back into the thin layer of condensed fluid. In one embodiment, the transducer is in the form of a transducer face.

In one embodiment, the transducer is adapted to avoid turbulence in the thin layer of condensed fluid. In one embodiment, the transducer is a piezoelectric transducer. In one embodiment, the transducer is a polymer transducer. In one embodiment, the transducer is a cylindrical transducer. In one embodiment, the transducer is a cylindrical transducer, and the sonochemical cell further comprises a sleeve to hold the thin layer of condensed liquid above the transducer face. In one embodiment, the transducer forms the bottom of a well, and the wall of the well is a hollow cylinder, wherein the thin layer of condensed fluid rests in the well above the transducer face, and the sides of the well support solid reaction surfaces, optionally electrodes, just above and parallel to the transducer face. In other embodiments, the solid reaction surfaces, optionally electrodes, are positioned radially between the inner cylinder wall and near the centerpoint of the circular cross section. In more embodiments, the sonochemical cell comprises solid reaction surfaces, optionally electrodes, which are parallel to the transducer face. In one embodiment, the sonochemical cell in operation increases an interfacial rate of a reaction in the thin layer of condensed liquid. In one embodiment, the sonochemical cell in operation increases a heterogeneous electron transfer rate of a reaction in the thin layer of condensed liquid.

In another embodiment, the sonochemical cell is a sonoelectrochemical cell which further comprises at least one electrode.

For example, one additional aspect provides for a device comprising: at least one sonoelectrochemical cell adapted to hold a thin layer of condensed fluid which is adapted to participate in a heterogeneous electron transfer reaction, wherein the cell is further adapted to provide an ultrasonic transducer, optionally an ultrasonic transducer face, to propagate sound waves into the thin layer of condensed fluid, and wherein the cell is still further adapted with an opening to provide the thin layer of condensed fluid with at least one interface which provides for reflection of the sound waves from the interface back into the thin layer of condensed fluid. The cell can further comprise at least one electrode. In one embodiment, the transducer is in the form of a transducer face.

In one embodiment, the transducer forms the bottom of a well, and the wall of the well is a hollow cylinder, wherein the thin layer of condensed fluid rests in the well above the transducer face, and the sides of the well support electrodes just above and parallel to the transducer face. In another embodiment, the electrodes are positioned radially between the inner cylinder wall and near the centerpoint of the circular cross section.

In another embodiment, the sonoelectrochemical cell comprises electrodes which are parallel to the transducer face. In another embodiment, the sonoelectrochemical cell comprises a working electrode, a counter electrode, and a reference electrode. In another embodiment, the sonoelectrochemical cell comprises a well having a top of the well, and when added the thin layer of condensed fluid can form a meniscus arching across the top of the well.

In another embodiment, the transducer is adapted to avoid turbulence in the thin layer of condensed fluid. In another embodiment, the transducer is a piezoelectric transducer. In another embodiment, the transducer is a polymer transducer. In another embodiment, the transducer is a polyvinylidene difluoride (PVDF) transducer. In another embodiment, the transducer is a cylindrical transducer. In another embodiment, the transducer is a cylindrical transducer, and the sonelectrochemical cell further comprises a sleeve to hold the thin layer of condensed liquid above the transducer face.

In another embodiment, the sonoelectrochemical cell in operation increases the heterogeneous electron transfer rate of a reaction in the thin layer of condensed liquid.

In another embodiment, the sonoelectrochemical cell comprises the thin layer of condensed liquid. In another embodiment, the sonoelectrochemical cell comprises the thin layer of condensed liquid, and the thin layer of condensed liquid is adapted to carry out a fuel cell reaction, optionally an alcohol oxidation reaction, optionally a methanol oxidation reaction. In another embodiment, the sonoelectrochemical cell comprises the thin layer of condensed liquid, and the thin layer of condensed liquid is adapted to carry out an oxygen reduction reaction.

In another embodiment, the sonoelectrochemical cell is adapted for batch operation. In another embodiment, the sonoelectrochemical cell is adapted for continuous operation.

Another aspect provides for a device comprising: at least one sonochemical cell, optionally a sonoelectrochemical cell, adapted to hold a thin layer of condensed fluid which is adapted to participate in a heterogeneous reaction, optionally a heterogeneous electron transfer reaction, wherein the cell is further adapted to provide an ultrasonic transducer, optionally an ultrasonic transducer face, to propagate sound waves into the thin layer of condensed fluid, and wherein the cell is characterized by a cell height which is less than the longest lateral dimension of the cell. In another embodiment, the cell is characterized by a cell height which is less than one-half the longest lateral dimension of the cell. In another embodiment, the longest lateral dimension of the cell is a diameter. In one embodiment, the transducer is in the form of a transducer face.

Another aspect is for a device comprising: at least one sonochemical cell, optionally a sonoelectrochemical cell, adapted to hold a thin layer of condensed fluid which is adapted to participate in a heterogeneous reaction, optionally a heterogeneous electron transfer reaction, wherein the cell is further adapted to provide an ultrasonic transducer, optionally an ultrasonic transducer face, to propagate sound waves into the thin layer of condensed fluid, and wherein the cell is characterized by a volume of solid reaction surface, optionally an electrode volume, and a cell volume, and the volume of solid reaction surface, optionally electrode volume, is at least 10% of the cell volume. In one embodiment, the transducer is in the form of a transducer face.

Another aspect provides for a device comprising: at least one sonochemical cell, optionally a sonoelectrochemical cell, adapted to hold a thin layer of condensed fluid which is adapted to participate in a heterogeneous reaction, optionally a heterogeneous electron transfer reaction, wherein the cell is further adapted to provide an ultrasonic transducer, optionally an ultrasonic transducer face, to propagate sound waves into the thin layer of condensed fluid, and wherein the cell is characterized by a solid reaction surface area, optionally an electrode surface area, and a transducer face surface area, and the solid reaction surface area, optionally electrode surface area, is at least 10% of the transducer face surface area. In one embodiment, the transducer is in the form of a transducer face.

Another aspect provides for a method comprising operating the device of any one of the devices described and/or claimed herein so that sound waves are applied to a thin layer of condensed fluid in the cell. In another embodiment, the application of ultrasound is carried out at an intensity to avoid turbulence in the thin layer of condensed liquid. In another embodiment, the application of ultrasound is carried out at an intensity to increase a heterogeneous reaction, optionally a heterogeneous electron transfer reaction, in the thin layer of condensed fluid. In another embodiment, the application of ultrasound removes a passivation layer or oxide layer of an electrode disposed in the device. In another embodiment, the application of ultrasound is carried out but then stopped, and optionally restarted. In one embodiment, the application of ultrasound is carried out without cooling of the cell. The temperature of the reaction can be essentially constant, without change, despite the sonication. In another embodiment, the application of ultrasound is carried out without pressurization of the cell. In one embodiment, the application of ultrasound is carried out both without cooling of the cell and without pressurization of the cell. In one embodiment, ultrasound is carried out without substantial temperature change in the overall cell.

Systems are also provided. The system can comprise the devices described herein and any associated components to make the devices useful such as a computer or control device. Systems providing an anode and a cathode are particularly of interest. One aspect, for example, provides for a system comprising (A) at least one cathode and at least one sonoelectrochemical device as described and claimed herein which provides an anode to the system, or alternatively (B) at least one anode and at least one sonoelectrochemical device as described and claimed herein which provide a cathode to the system, or alternatively (C) at least one sonoelectrochemical device as described and claimed herein which provides an anode to the system, and at least one sonoelectrochemical device as described and claimed herein which provide a cathode to the system. The sonoelectrochemical device in the system can comprise the anode and/or the cathode as needed A variety of important advantages flow from one or more different embodiments described herein.

In at least some embodiments, for example, an advantage is that faster reactions, including faster heterogeneous reactions, including faster heterogeneous electron transfer reactions, can be achieved. Interfacial reaction rates can be improved and reaction pathways altered.

In at least some embodiments, an advantage is that costly noble metal electrodes can be replaced with less costly electron conductors and catalysts.

In at least some embodiments, an advantage is that the energy cost to run the ultrasonic transducer in a thin layer is very low.

In at least some embodiments, an advantage is that device efficiency and possibly operational lifetime can be improved, and catalysts and electrodes can be activated for longer periods or indefinitely under sonication.

In at least some embodiments, where turbulence is avoided, advantages can include that lesser input energy is needed to drive interfacial kinetics, that electrochemical signals can be readily interpreted, and that the opportunity to work at higher intensities is provided to evaluate utility of turbulence in these systems.

Additional advantages include many found in application areas related to energy- and environment-related industries.

BRIEF DESCRIPTION OF THE DRAWINGS

FIG. 9 shows reaction scheme for the reduction of oxygen to water. Note this is a complex four proton, four electron process. The first single electron transfer is thought to be the slow step under acid conditions at the platinum electrodes.

DETAILED DESCRIPTION

Introduction

Figure 1:
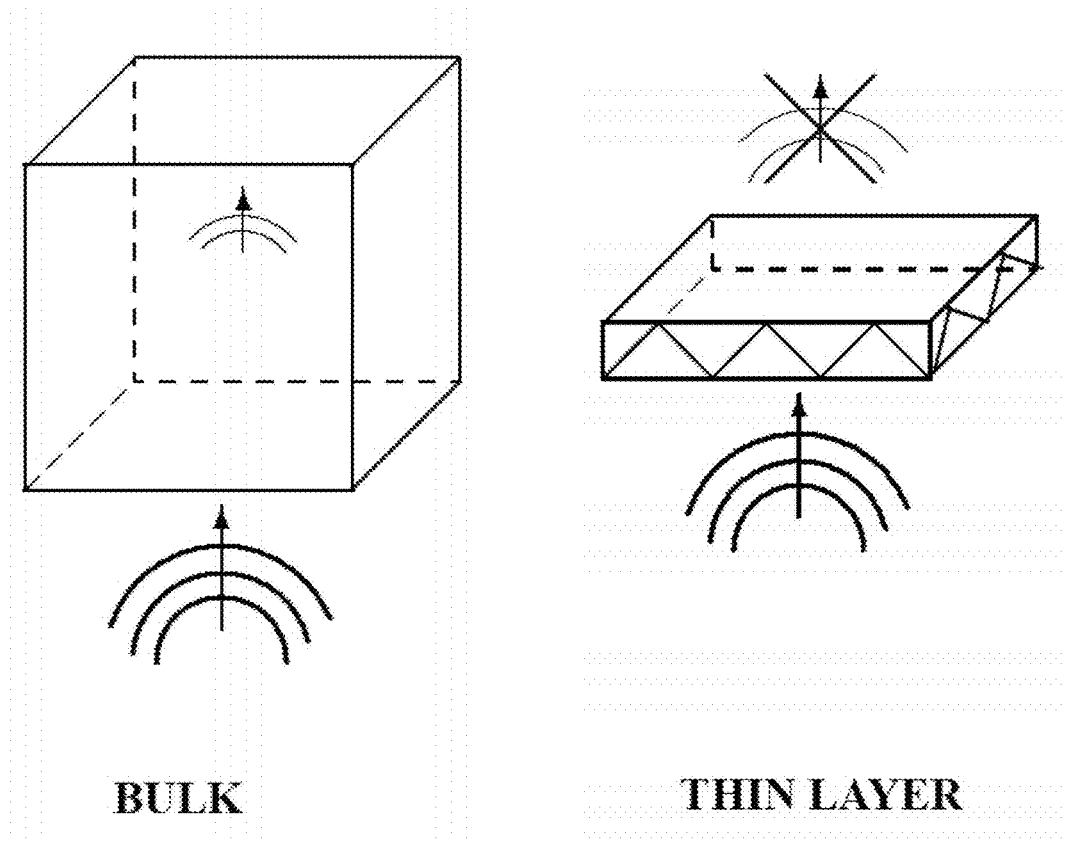
FIG. 1 illustrates the principles when acoustic waves are applied to a bulk phase (left) and a thin layer phase (right). The sound energy dissipates in the bulk phase. In the thin layer phase, dissipation sound energy is diminished, and sound waves are reflected off the liquid air interface back into the liquid so that little or no sound energy is transmitted into the less dense air phase above the thin layer of condensed fluid.

Priority U.S. Provisional Application Ser. No. 61/891,727 filed Oct. 16, 2013 is hereby incorporated by reference in its entirety for all purposes including its working examples. This includes the Duda thesis including chapters 1-9 covering, respectively, Introduction, Construction and General Operation of the Thin Layer Sonoelectrochemical Cell, Effects of Low Intensity Sonication in a Thin Layer on Heterogeneous Electron Transfer Kinetics, Impact of Acoustic Energy on Electrode Surfaces, Impact of Low Intensity Sonication in a Thin Layer on Oxygen Kinetics, Application of Marcus Theory to Sonoelectrochemistry, Impact of Low Intensity Sonication in a Thin Layer on Methanol Kinetics, Examination of Alternative Electrodes, and Conclusion and Future Work. Various aspects of the thesis are found throughout the following description and noted accordingly.

As known in the art, ultrasound has the ability to generate high energy cavitation in condensed fluid or liquid phases. For example, temperatures greater than 5,000 K and pressures greater than 1,000 atmospheres can be generated.

In one embodiment provided herein, such large energy cavitation effects are avoided. In another embodiment, such large energy cavitation effects are created and can impact mass transport.

One skilled in the art can adapt the intensity and frequency of the sound energy wave(s). Power ultrasound in the 20-100 kHz can be used. Occasionally, yet higher frequencies can be used. The increased pressures and temperatures can increase reaction rates. Also, they can break up solids and can remove passivating layers of inert material to give larger surface area for reaction.

In a first aspect, the device comprises: at least one sonochemical cell adapted to hold a thin layer of condensed fluid, wherein the cell is further adapted to provide an ultrasonic transducer face to propagate sound waves into the thin layer of condensed fluid, and wherein the cell is still further adapted with an opening to provide the thin layer of condensed fluid with at least one interface which provides for reflection of the sound waves from the interface back into the thin layer of condensed fluid. These devices and elements are described in more detail below. For example, in one embodiment, the transducer is adapted, and its use is adapted, to avoid turbulence in the thin layer of condensed fluid.

Devices, Systems, and Sonochemical Cells

A sonochemical cell is generally known in the art. See, for example, references cited herein in the Background Section and in the listing of references cited hereinbelow. The sonochemical cell can be adapted in some embodiments to be a sonoelectrochemical cell, whereas in other embodiments, it is merely a sonochemical cell without necessarily being an electrochemical cell. A sonoelectrochemical cell can be adapted to include at least one electrode, for example. The sonochemical cell can be adapted also to carry out interfacial and heterogeneous reactions. In a sonochemical cell, the solids are not necessarily in an electrical circuit as in a sonoelectrochemical cell. The solids can provide for a solid reaction surface. In a sonochemical cell, the solid can be any dense phase not soluble in the fluid. The solid could be, for example, a sheet, wire, or even particulate or nanomaterials. In a sonoelectrochemical cell, these solids are part of the electrical circuit.

"Sono(electro)chemical" or "sono(electro)chemistry" means that the "electro" aspect of the "sonochemical" or "sonochemistry" can be included but is optional.

One additional aspect provides for a device comprising: at least one sonoelectrochemical cell adapted to hold a thin layer of condensed fluid which is adapted to participate in a heterogeneous electron transfer reaction, wherein the cell is further adapted to provide an ultrasonic transducer face to propagate sound waves into the thin layer of condensed fluid, and wherein the cell is still further adapted with an opening to provide the thin layer of condensed fluid with at least one interface which provides for reflection of the sound waves from the interface back into the thin layer of condensed fluid. The cell can further comprise at least one electrode.

The thin layer of condensed fluid can have a height which is adapted to provide for the effects described herein and can be kept thin in contrast to the prior art bulk approach. The precise height of the condensed fluid may vary depending on the application and the overall size of the device. For example, the height of the thin layer can be about 100 mm or less, or about 50 mm or less, or about 20 mm or less, or about 10 mm or less, or about 5 mm or less. There is no strict, absolute lower limit on height of condensed fluid, but the height can be greater than, for example, 1 mm, or 2 mm. The height can be measured from the low point of the meniscus rather than the high point of the meniscus if a meniscus is present in the condensed fluid.

The height of the thin layer can also be the height of the cell or the cell wall if the liquid totally fills the cell.

Devices, Systems, and Sonoelectrochemical Cells

Figure 2:
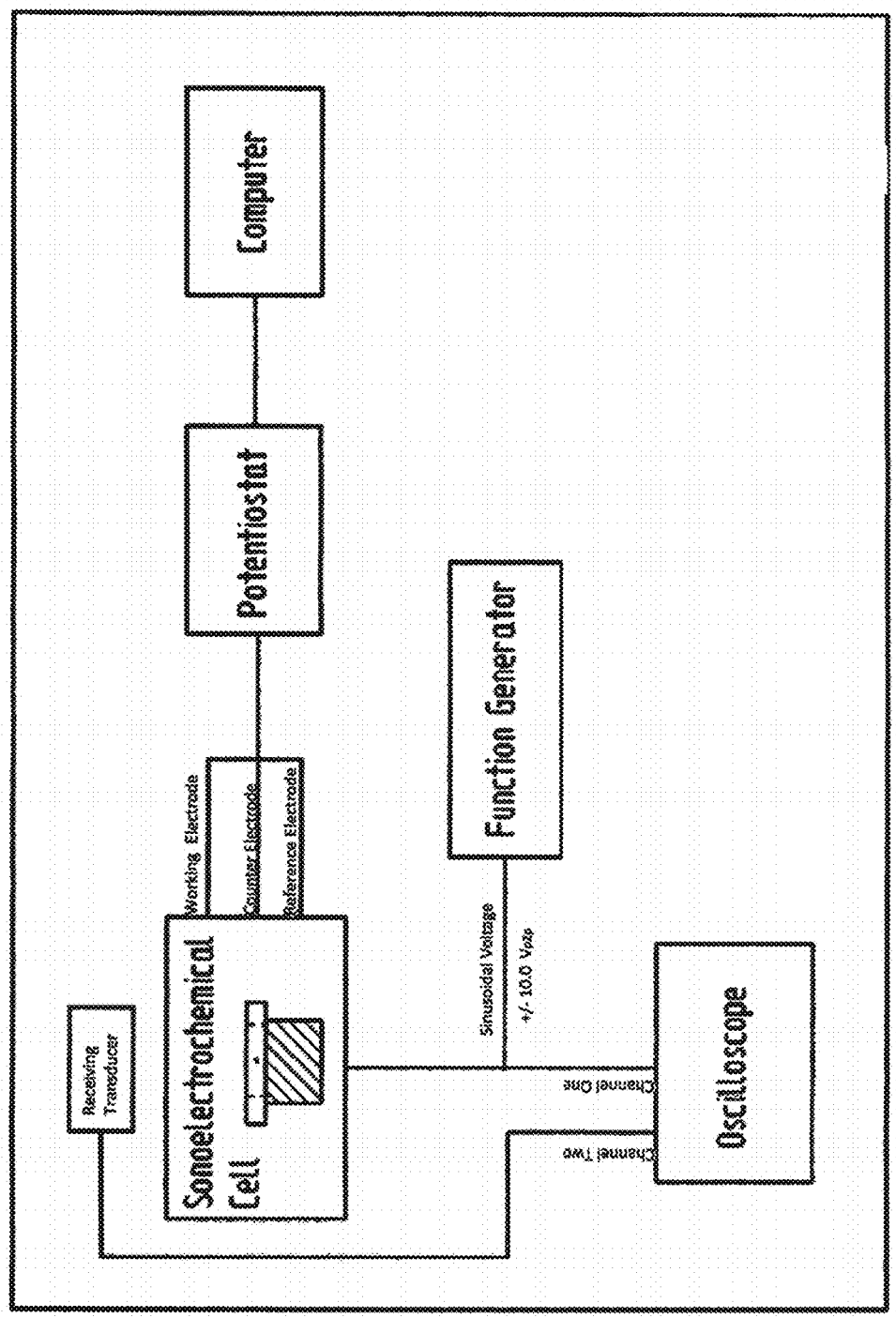
FIG. 2 shows, for one embodiment, a schematic of the sonoelectrochemical system.

A sonoelectrochemical cell is also generally known in the art. See, for example, references cited herein in the Background Section and in the listing of references cited hereinbelow. The sonoelectrochemical cell generally has at least two main components which are adapted to function together. The first component provides for the electrochemistry as in a conventional electrochemical cell. The second component provides the ultrasonic energy (also used in the sonochemical cell). FIG. 2 provides one embodiment in schematic form showing related aspects of the cell and its place in the larger system. The larger sonoelectrochemical system, which is used to operate the cell, can include, for example, an oscilloscope, a receiving transducer, a function generator, a potentiostat, and a computer. The oscilloscope, receiving transducer, and function generator can control the ultrasound source. The potentiostat can be dedicated to controlling the electrochemistry. Connecting devices such as alligator clips can be used to connect the oscillator to a voltage source that drives the oscillator. The potentiostat and the voltage source are electrically isolated. In a fuel cell, for example, the working and counter electrodes can be connected across a load as the fuel cell discharges the chemical energy of the oxidant and fuel. The system can provide for both an anode and a cathode, wherein the anode, the cathode, or both anode and cathode are provided for by the sonoelectrochemical cell as described and claimed herein.

In addition, the two components of the sonoelectrochemical cell are adapted to function together to provide a containment volume to hold a condensed fluid (e.g., liquid or liquid electrolyte). For example, the face of the transducer can form one wall, a floor, to contain the condensed fluid. The entire floor can be the transducer face, or the transducer face can make up a majority of the floor, including, for example, at least 75%, or at least 85%, or at least 95% of the floor. The transducer face can be in a shape characterized by a longest lateral dimension. If the shape is a circle, for example, the longest lateral dimension is the diameter. If the shape is a rectangle, for example, the longest lateral dimension is the diagonal. The surrounding walls can be made of a variety of solid materials including polymers such as, for example, a hydrophobic polymer like Teflon, or a rubbery or elastic polymer, or any number of synthetic polymers such as rubber, vinyl, or plastic such as PVC. The container walls also can provide for an opening to allow sound wave reflection. More particularly, the container walls also can provide an interface open to less dense atmosphere to allow sound wave reflection at the fluid/less dense phase interface.

The internal walls of the cell can take any number shapes to achieve the thin layer effect. One embodiment is a cylinder or a shape substantially similar to a cylinder. However, this can be adapted for scale up and commercialization. In the cylinder embodiment, the transducer face forms the floor at one end of the cylinder and the other end of the cylinder can be an open area or also called an opening.

In one embodiment, in a sandwich configuration, a second transducer or oscillator can be included at the other end of the cell, or where the cell is cylinder shaped, at the other end of the cylinder.

Figure 16:
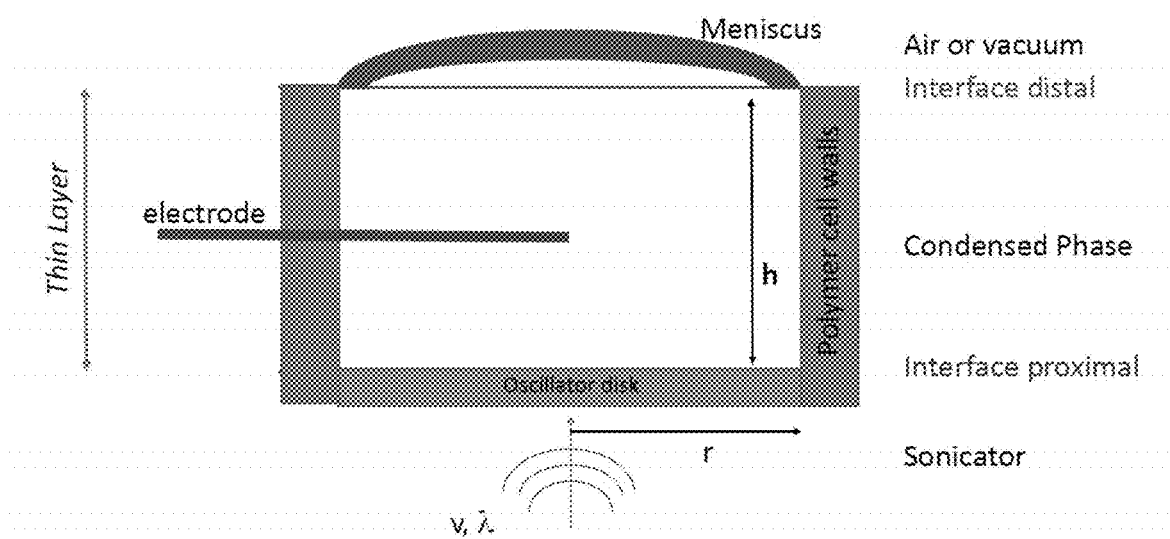
FIG. 16 shows an illustration of an embodiment for the thin layer sonoelectrochemical cell.

FIG. 16 illustrates one embodiment for the sonoelectrochemical cell showing the oscillator disk at the bottom, above or part of the sonicator. The sonicator has a frequency and intensity which can be controlled. The cell walls, which can be polymer, can hold the condensed fluid phase. The top is open to provide the distal air or vacuum interface. A meniscus can be present, particularly when the cell walls are made of hydrophobic material. The meniscus can be at least partially removed if desired, using for example a syringe. Length or lateral dimension radius r and height dimension h can be used to control the cell operation and ensure that a thin layer is present.

In the thin layer concept, the height of the layer is controlled and minimized sufficiently so that a reaction effect is seen as described herein.

The following conditions can exist in the cell and may or may not be important for a particular embodiment: (a) cell height h about $\lambda/2$ or $\lambda/4$ where $\lambda$ is wavelength of oscillator; (b) electrodes have been placed at mid height of cell, $\lambda/4$ or $\lambda/8$.

In one embodiment, h and r are controlled so that cell height h<r, where r is the radius of cell. Or, cell geometry can be such that h<2r. If the condensed fluid does not fully fill the cell, then the height of the condensed fluid can be used.

In one embodiment, the oscillator disk has radius comparable to r, so oscillator covers almost the entire bottom of the cell. For example, the cell floor can be at least 75%, or at least 90%, the area of the transducer face.

In one embodiment, the transducer does not have a flat face. Pin or horn transducers are known.

The sonicator can be positioned so that acoustic energy propagates normal to the oscillator disk and through the thinnest condensed phase coordinate (from proximal toward distal interface).

In one embodiment, electrodes can extend well into the cell and approach the center of the cell so as to capture acoustic energy generated at the proximal interface by the oscillator. In one embodiment, the electrode traverses the cell. In one embodiment, all three electrodes (working, counter, and quasireference electrodes) extend radially toward the center of the cell. Electrodes can be as close to the center of the cell as possible without contact. Configurations with only working and/or counter electrodes in the center may be effective. In one embodiment, quasireference/reference electrode that is recessed in the cell wall or pulled well back from center of cell may provide a stable reference. While not needing to be limited by theory, it is probable that the intensity of the oscillations is maximized in the center of the cell. FIG. 16 shows only one electrode but in a working example system all three electrodes (working, counter, and quasireference) are in the thin layer. The design can also use two electrodes (e.g., the working and counter electrodes between which current flows). For a single electrode, the working electrode can be placed in the thin layer domain and the other electrode(s) placed in the electrolyte but outside the thin layer.

FIG. 1 also illustrates the distinctions between a bulk phase (left) and a thin layer phase (right), providing the thin layer effect. In the bulk phase, sound energy is lost to dissipation. In the thin layer, losses to dissipation are reduced and the interface between the condensed fluid and less dense fluid (e.g., atmosphere) can provide reflection of the sound energy back into the condensed phase.

Ultrasonic transducers, or oscillators, are known in the art and commercially available. The transducer can have a face, which is a relatively or substantially flat surface which vibrates, creating ultrasonic effect in a liquid or condensed fluid phase in contact with it. The transducer can be, for example, inorganic or polymer. The transducer, also called an oscillator, can be a quartz crystal oscillator driven by voltage that represents a very small parasitic power loss to the system (because quartz crystal oscillators are voltage driven with very little current drain).

The transducer can be operated at a frequency which can be tailored by the skilled artisan. Ultrasound, above human hearing, can be used including a range above 20 kHz. In general, for example, relatively low frequency can be used such as, for example 4 kHz to 400 kHz, or higher frequencies extending into the megahertz range may be useful in some systems.

The transducer and other system components can be adapted so that visible bubbles and visible turbulence are not found in the condensed fluid when the transducer is operated. For example, no bubbles could be discerned with the naked eye, in one embodiment. An unexpected feature was embodiments wherein there was no visible turbulence or bubbles.

In another embodiment, turbulence and larger bubbles can be intentionally created.

Several approaches can be used to quantify what is meant by a thin layer which stands in contrast to a bulk system. A useful calculation is to measure the ratio, expressed as percentage, of the electrode volume with the volume of the cell (measured with no condensed fluid phase present in the cell). Alternatively, one can measure the percentage of the electrode volume relative to the volume of the condensed fluid phase in the cell. These percentages can be relatively high, e.g., at least 10%, or at least 20%, or at least 50%, or at least 90%. In doing the calculation, one can select either a single electrode volume or all the electrode volumes. In addition, non-electrode solid surface areas can be provided which provide for a volume measurement in a sonochemical cell.

Similarly, the ratio of the surface area of the electrode with the surface area of the transducer face which creates sound waves in the cell can be measured, and can be relatively high, e.g., at least 10%, or at least 20%, or at least 50%, or at least 100%, or at least even higher percentages. In doing the calculation, one can select either a single electrode surface area or all the electrode surface area. In addition, non-electrode solid surface areas can be provided which provide for a surface area measurement in a sonochemical cell.

The prior art does not recognize the importance of these ratios and fails to teach or suggest the thin layer concept.

The height of the fluid, or the height of the cell, can be $\lambda/4$ where $\lambda$ is the wave-length of the sound.

The sonoelectrochemical cell, preferably, is constructed without use of a sonic horn. A tip is not used to generate the ultrasound, preferably. Rather, a flat transducer face is preferred to generate the ultrasound. A plane source for the ultrasound is preferred over a line source or a point source. Of course, the plane source is confined by the dimensions of the ultrasound transducer face.

Ultrasound can generate heat. In a preferred embodiment, a cooling system is not used for the sonoelectrochemical cell. In one embodiment, the temperature of the overall cell is not increased significantly on sonication. This can be an important aspect in portable systems like laptop power-packs, for example.

Also, ultrasound can generate pressure. In a preferred embodiment, the cell is not pressurized. In addition, the larger system comprising the cell can be used without pressurization.

The electrodes are not particularly limited but are sufficiently conductive and dense and can be adapted for a particular application. They can be metals including, for example, platinum, tungsten, aluminum, stainless steel, iron, or nickel. In some embodiments, the electrodes can be semiconductor material electrodes. In other embodiments, the electrodes can be carbon electrodes. The acoustic energy generated at the proximal interface can travel through the condensed fluid and transmit effectively to the solid electrode and/or into the solid electrode. The electrode can be more dense than the surrounding condensed fluid. A wide variety of shapes and sizes for electrodes can be used including wire, cylindrical structures. The electrodes can be firmly anchored and chemically and mechanically stable. Mechanical stability relates here to macroscopic integrity, not to atomic level stability.

A single device can comprise one or more sonoelectrochemical cells. For example, the device can comprise two or more, five or more, ten or more, or 100 or more cells. In principle, one transducer can drive more than one cell.

The condensed fluid forming the thin layer can be a wide variety of fluids supporting an electrochemical reaction. They can be an electrolyte, for example. They can be aqueous or non-aqueous. The fluid can be degassed.

Electrodes can be positioned approximately in the mid height of the cell. In another embodiment, electrodes can be placed as close as possible to the transducer.

The thin layer of condensed fluid can form a meniscus. While the invention is not limited by theory, this meniscus can be important in focusing the sound back at the electrodes. The meniscus may act as an energy lens for some embodiments. Electrodes can be positioned to optimize the energy available from any effects of focusing.

The thin layer of condensed fluid is provided with a fluid interface which reflects back at least a substantial portion of the sound wave. The physics of sound travel are well-known. Acoustic energy dissipates in bulk phases and propagates through/into phases of higher density. Sound travels more effectively, faster through dense media (generally, solid>liquid>gas>vacuum). Transmission from a condensed phase into air or vacuum is not favored. When the sound wave travels from a relatively dense medium into a relatively less dense medium, reflection back at the interface can result. The fluid interface can be a fluid-gas, fluid-air, a fluid-nitrogen, fluid-oxygen, or a fluid-vacuum interface. Use of a cap such as, for example, a glass cover slide on top of the thin layer cell removes the effects of the thin layer sonication. A dense solid like glass will transmit sound out of the less dense fluid. A vacuum outside of the fluid can increase efficiency of acoustic energy capture. Preferably, at least 50%, or at least 75%, or at least 90% of the sound energy is reflected back. The amount reflected back can be, for example, less than 95%.

Figure 15:
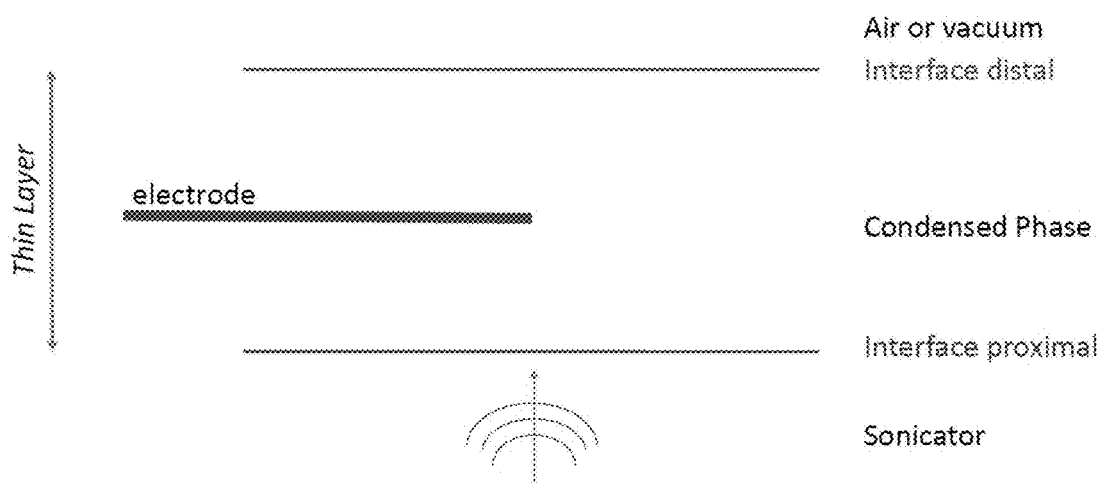
FIG. 15 shows an illustration of thin layer sonoelectrochemical (TLSE) electrode system.

FIG. 15 illustrates, in one embodiment for the thin layer sonoelectrochemical (TLSE) electrode system, the relationship for sonicator, direction of sound waves, proximal interface, condensed phase with electrode therein, and the distal air or vacuum interface. Due to the thin layer, sound dissipation is minimized. Due to the air or vacuum, acoustic energy does not easily escape the condensed phase. The solid electrode(s) capture acoustic energy from liquid phase as electrodes higher density than liquid phase. The sonicator has sufficient intensity and frequency to transmit energy into condensed phase. The energy is sufficient to impact reactions, especially at the electrode surface. The energy could lead to an increase in interfacial rate or a change in reaction mechanism.

The atmosphere surrounding the sonoelectrochemical cell can be controlled. For example, an enclosure, whether flexible or rigid, can be used. Vacuum can be applied. Inert gas like nitrogen or argon can be used. If the reactant is a gas such as, for example, oxygen, then the gas such as oxygen can be used.

In one embodiment, the cell is quiescent and no stirring is induced into the cell.

Figure 3:
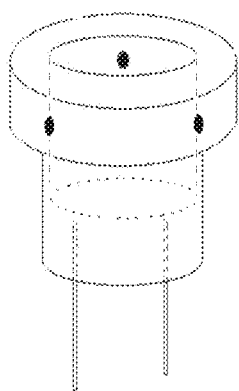
FIG. 3 illustrates, for one embodiment, a well which is constructed above a cylindrical transducer. The dashed line is the view of the transducer. The two wires below are the leads to the transducer. The solvent well is the hole open on top (opening). The three small circles are holes for the insertion of the electrodes.
Figure 4:
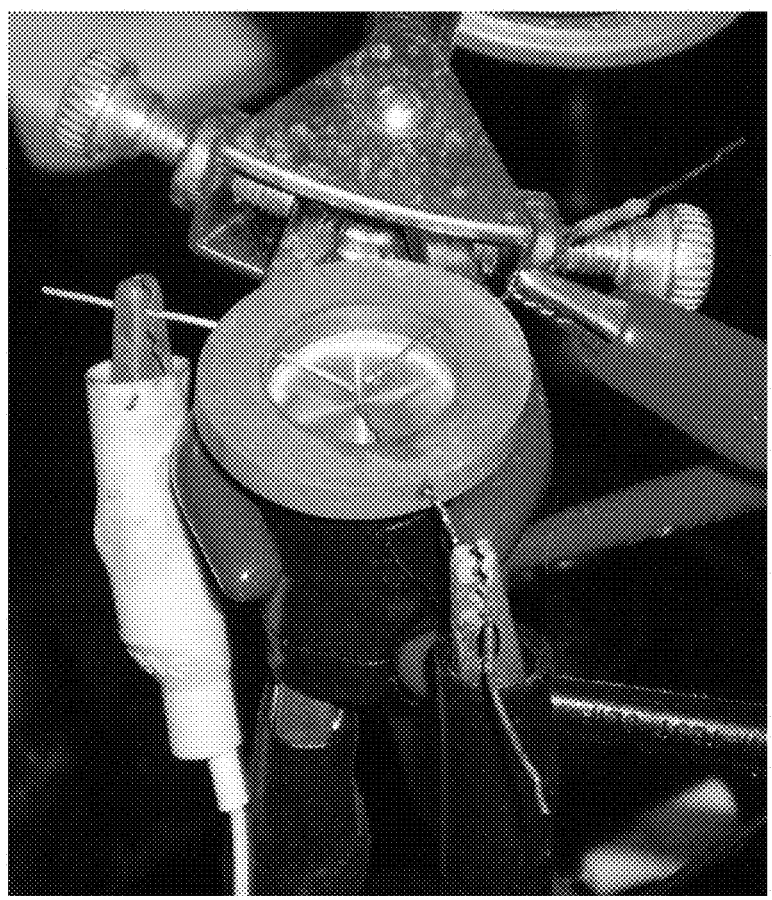
FIG. 4 illustrates, for one embodiment in Example 1, a photograph of a first sonoelectrochemical cell constructed from a garden hose washer glued to the face of the transducer. The working and counter electrodes are composed of platinum wires. The reference electrode is silver/silver oxide.

Two embodiments for the sonoelectrochemical cell are described in working example 1 herein. See FIGS. 3, 4, and 5.

The sonoelectrochemical cell can be adapted for batch operation or for semi-continuous or continuous operation. The cell, for example, can have an inlet and an outlet port.

Heterogeneous Electron Transfer Reactions and Interfacial Processes

In a sonochemical cell, heterogeneous reactions and interfacial reactions can be enhanced, accelerated, and/or altered.

Any process or technology, including any electrochemical process or technology, could be used well with thin layer sono(electro)chemistry where there is a kinetic loss associated with, for example, (a) electron transfer rates, and/or (b) mass transport, and/or (c) a passivating layer is formed or present. In particular, thin layer sono(electro)chemistry can be effective where there is a limitation in the electron transfer step(s) at the electrode surface. There may be no effect when the electron transfer step is a fast reaction. See for example Working Example 2 herein.

Single or multi-electron transfer reactions can be impacted.

One important reaction is the oxygen reduction reaction (ORR).

Another important reaction is electrolysis of alcohol such as methanol.

Figure 6:
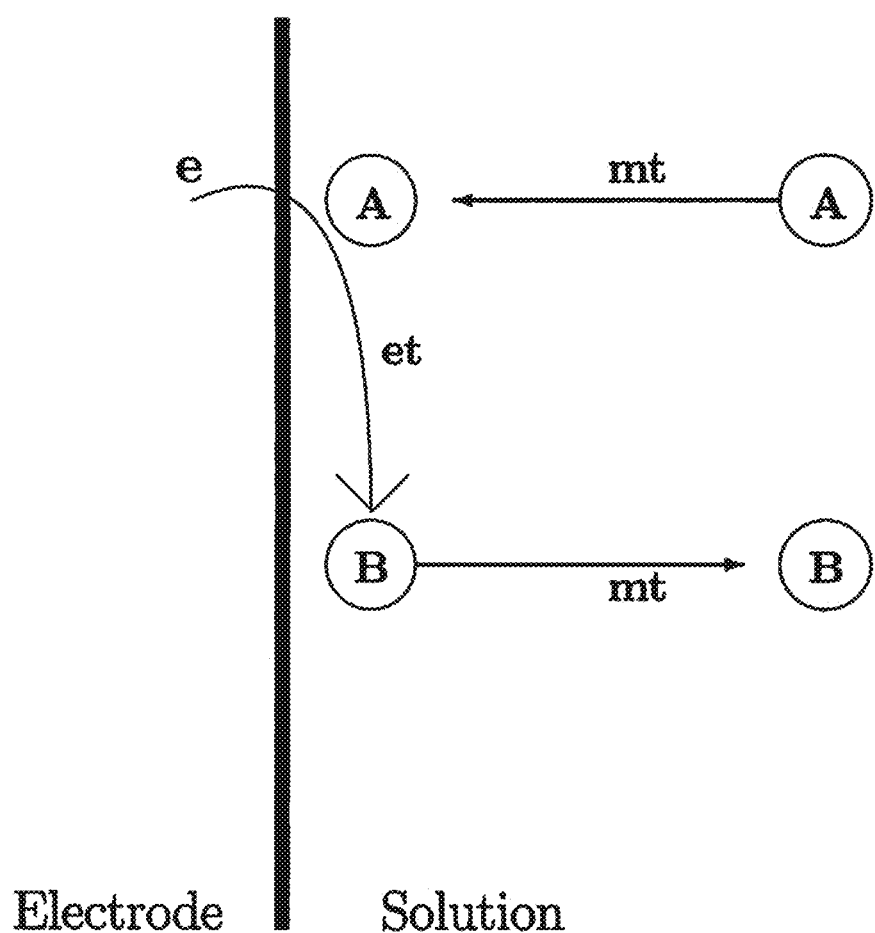
FIG. 6 illustrates heterogeneous electron transfer which occurs across the electrode solution interface. Here, the reaction is $A+e \leftrightarrows B$. The process of electron transfer involves mass transport (mt) of reactant to the electrode where it undergoes electron transfer (et) at the electrode surface to form product that then undergoes mass transport to the bulk of the solution.

FIG. 6 illustrates an embodiment for a heterogeneous electron transfer reaction. In a thin layer sonoelectrochemical cell, tailored for a heterogeneous electron transfer reaction, acoustic energy is imparted at or into the electrode solution interface to increase the rate of the heterogeneous electron transfer.

Method of Using, Applications

The methods and devices described herein, generally, can be applied to any reaction or heterogeneous catalyst that is slow and may become rapid upon sonication. In addition, they can be applied to situations where interfacial adsorbates are present and where interfacial reactions are slow and yet critical to many electrochemical technologies and syntheses. In addition, they can be applied to adsorbate removal where adsorbates passivate the surfaces.

The devices can be adapted to operate in practical use in a batch, semi-continuous, or continuous mode.

A device can be made which comprises a plurality of sonochemical cells, including sonoelectrochemical cells. Both electrochemical and non-electrochemical applications can be carried out.

Non-electrochemical applications of the thin layer sonochemical cells include systems of heterogeneous reaction and heterogenous catalysis. Further, the thin layer environment for homogenous reactions will impart localized temperature and pressure excursions that affect a greater volume fraction of the fluid than is available in a bulk sonochemical reactor.

Electrochemical applications include, for example, fuel cells, batteries, electrolyzers, and electrosynthetic systems such as, for example, chloralkali processes, aluminum refining, and ammonia production.

Figure 17:
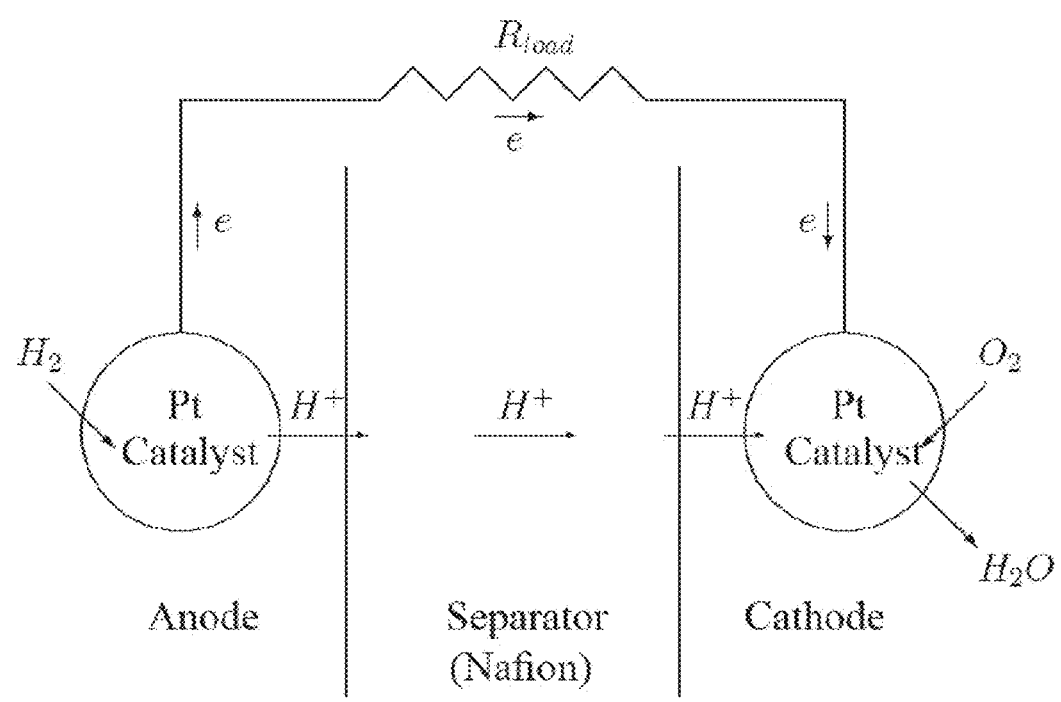
FIG. 17 shows an illustration for $H_2/O_2$ or $H_2$/Air fuel cell.

A variety of fuel cells can be made including, for example, direct methanol fuel cell (DMFC) and polymer electrolyte membrane (PEM) fuel cells. FIG. 17 illustrates a PEM fuel cell for hydrogen embodiment using Pt catalyst and Nafion separator. $O_2$ can be provided by, for example, pure $O_2$ gas or from the air. The oxygen reduction reaction (ORR) limits hydrogen fuel cell performance. Under normal operational conditions, losses for the ORR decrease energy output about 30% from thermodynamic values. Operation is at a low temperature, e.g., 80° C., near to below boiling point of water. Operation can be carried out at about 25° C. or ambient or room temperature, but the ORR still limits performance.

A variety of batteries can be made including, for example, air batteries including zinc air batteries and zinc air hearing aid batteries. Other kinds of hearing aid batteries can be made.

Electrolyzers can be used for hydrogen generation and oxygen generation.

Another application includes carbon capture and sequestration, where carbon dioxide is converted to value added products and fuels.

In another application, systems based on emulsions can allow synthesis and separation in one cell, thereby reducing costs of electrosynthesis.

Other applications include, for example, solar, photovoltaic, hydride storage, supercapacitors, and redox flow batteries.

Another application is a sensor such as, for example, a chemical sensor such as an acetone sensor, a medical sensor, or a consumer sensor.

Another application is in a pump, including use with microfluidic devices and medical sensors.

Another application is plating.

Applications which include the oxygen reduction reaction (ORR) are particularly important.

Medical devices can be prepared which comprise one or more of the sonochemical and sonoelectrochemical cells as described herein.

Efficient direct electrochemical oxidation or reduction of organic fuels such as methanol are critical technology examples that are environmentally advantageous and rely on renewable fuels.

Method of Making Device

Methods known in the art can be used to prepare the devices and the sonoelectrochemical cells. For example, the working examples illustrate how to make several embodiments.

Quartz Crystal Oscillators (Transducers)

Various types of oscillators are available as ultrasound and infrasound transducers. One type of oscillator is the quartz crystal oscillator. Such oscillators are reliable but designed to a single frequency. Available frequencies range from a few kilohertz to several megahertz. Because quartz crystal oscillators are driven by voltage, the conversion of voltage to mechanical oscillation is very efficient. The very small current draw corresponds to very small parasitic power losses and long life times for battery powered oscillators that are critical to portable technologies.

A second class of piezoelectric materials, ceramics, includes lead zirconium titanate (PZT) which may be used. PZT provides frequencies of 100 kHz to 1 MHz.

Polymer Based Transducers

In one embodiment, the transducer is a polymer transducer which can provide advantages and mechanisms for constructive and destructive interference, bilayer oscillators, pumping options, and intensification of the signal, as well as control of intensity, frequency, and waveform, and the basic means for controlling the system response, especially in a computer controlled system. In particular, a polymer transducer can provide more effective control of intensity and wave form as well as more varied system designs (e.g., dual sandwiched transducers, pumps). The polymer transducers are piezoelectric materials.

A polymer transducer can also provide greater lifetime.

Polymer based transducers can allow pumping of reactants in and products out of the cell. The polymer can be a piezoelectric polymer.

The polymer can have a tunable frequency and intensity.

The polymer can be flexible and formed into many geometries such as, for example, tubes and spirals.

The polymer can be polyvinylidene fluoride (PVDF) including β phase PVDF.

A cell can be made with two facing polymer sheets such as PVDF sheets.

The frequency and intensity of the polymer transducers can be varied and controlled through a voltage program. Thus, a specific system can be optimized with respect to frequency and intensity. When computer controlled, the voltage program can optimize complex reaction sequences, mass transport, and pumping of reactants.

Additional aspects of polymer based transducers are provided in priority provisional application 61/891,727 which is incorporated herein by reference.

Effect on Electrode Surface

The thin layer sonication can activate an electrode surface (e.g., a platinum electrode surface) by removing a surface layer such as, for example, an oxide surface layer. In some embodiments, the electrode surface can be cleaned including, for example, cleaned of deposited by-products. This activation may be one of several contributing factors to enhance reactions, especially in complex reaction schemes.

WORKING EXAMPLES

Additional embodiments are provided in the following non-limiting working examples.

Example 1: Fabrication and Use of Sonoelectrochemical Cell

The sonoelectrochemical cells of the working examples were based on a quartz crystal ultrasonic transducer that served as the bottom face of a thin electrolyte volume in which three electrodes were deployed. The transducer and the electrochemical cell were on separate circuits and isolated electrically. The electrodes and potentiostat were electrically isolated from the transducer and voltage supply.

1.1 General Overview of System Components

Construction of the sonoelectrochemical cell system of the working examples was a fusion of two independent systems: an acoustic energy generator and a standard electrochemical cell built around the transducer. FIG. 2 is a schematic of the system.

1.2 Generation of Ultrasonic Waves

The central component of acoustic energy generation was the transducer, which acted as a speaker to produce mechanical vibrations of ultrasound. The transducer was driven by a frequency generator, the signal of which was monitored with a digital oscilloscope.

1.2.1 Transducer

Ultrasonic sound waves were generated with a transducer. Commercial availability of low power, small scale transducers was limited. A commercially available Air Ultrasonic Ceramic Transducer (Prowave, T400ET/R180) was used. See FIGS. 7 and 8 of priority provisional application 61/891,727 which are hereby incorporated by reference. In these transducers, aluminum encased a piece of piezoelectric material. The piezoelectric material expanded and contracted in response to the oscillating potential. The intensity of the sound wave increased with increased potential.

1.2.2 Function Generator

The transducer was driven with a frequency generator that produced a sinusoidally modulated potential between −10 V and +10 V at a frequency of 41 kHz. The system utilized a BK Precision 4011A 5 MHz Function Generator.

1.2.3 Signal Monitoring

Because the amplitude (intensity) of the modulated potential was not displayed by the function generator, the potential was monitored independently with a High Techniques IQ-300 Data Acquisition System (DAS) that served as a dual channel oscilloscope.

1.2.3.1 Direct Input Monitoring

The DAS was directly attached to the leads that connect the function generator to the transducer to monitor directly the driving potential applied to the transducer.

1.2.3.2 Indirect Output Monitoring

Because a transducer can perform as both transmitter and receiver (speaker and microphone), a second transducer was attached to a second channel on the DAS to confirm the generation of ultrasonic sound waves. The face of one transducer was placed directly in front of the face of the other transducer to make the measurement. This was primarily used to confirm that the transmitting transducer was functioning and was not included in thin layer sonoelectrochemical cell experiments because the solvent layer displaced the second (receiver) transducer.

1.3 Cell Configuration

The electrochemical cell was constructed above the face of the transducer. See FIG. 3. The transducer forms the bottom of the well where the wall of the well was a hollow cylinder. The electrolyte solution rested in the well above the face of the transducer. The sides of the well supported electrodes just above and parallel to the transducer face. The three electrodes were wires positioned radially between the inner cylinder wall and near the centerpoint of the circular cross section. See FIG. 10 of priority provisional 61/891,727, rightmost illustration, for a topdown view, which is incorporated herein by reference.

1.3.1 First Configuration (Garden Hose Washer)

The first sonoelectrochemical cell was constructed with a garden hose washer composed of red rubber. Holes were punched through the edge of the washer to accommodate the electrodes. The washer was then fastened to the face of the transducer with cyanoacrylate glue. See FIG. 4.

1.3.2 Second Configuration (Teflon Sheath with O-Ring Seal)

A second sonoelectrochemical cell was constructed. Stock Teflon rod was machined to form a sleeve around the transducer. The Teflon structure replaced the rubber washer of the first configuration. The sleeve was sealed with an O-ring that rested below the face of the transducer. The sonoelectrochemical cell was held together by the snug fit of the components. No glue was used. See FIG. 5.

1.4 Relationship of Peak Voltage, $V_p$, to Pressure

The relationships between acoustic parameters and the input of electrical signals that cause the piezoelectric transducer to generate sound waves are numerous. See discussion in priority provisional 61/891,727 at pages 21-38 of Duda's dissertation which is incorporated herein by reference. The intensity of the oscillator was varied as percent of maximum intensity accessible in the system. Throughout, data may be plotted against either percent of maximum intensity or $V\Delta P$, the product of volume and pressure change on sonication.

(Details are provided in the priority provisional application 61/891,727, incorporated herein by reference.). Both percent of maximum intensity and $V\Delta P$ describe the same increases in pressure in the system on sonication. Percent of maximum intensity and $V\Delta P$ are directly proportional and 0% intensity is equivalent to $V\Delta P=0$.

1.5 Electrochemical Measurements

Electrochemical measurements, specifically cyclic voltammetric sweeps, were performed in a standard three electrode configuration. Scan rate, electrode composition, probe concentration and sensitivity settings varied with experiment.

1.5.1 Potentiostat

Measurements were made with a BAS 100B Electrochemical Analyzer controlled with a HP pavilion 520W computer system under a Microsoft Windows 2000 operating system.

1.5.2 Electrode Generation

Unless otherwise specified, working and counter electrodes consisted of platinum wires 0.5 mm in diameter with 8 mm of length with all surfaces exposed to the solution. Reference electrodes were composed of either a similar piece of platinum wire (Pt/PtO) or 0.5 mm diameter silver wire reacted with concentrated nitric acid (Ag/Ag$_2$O).

1.5.3 Reference Stability

Sonication provides energy to the system. This energy can be used to enhance slow heterogeneous electron transfer kinetics. The energy can also be transferred into the electrodes. Several electrode materials were found to be unstable. This included the current carrying electrodes as well as the reference electrode. Early measurements were undertaken with a silver/silver chloride reference electrode or a silver/silver oxide quasireference electrode. After the solution had been sonicated for several minutes, the silver/silver chloride reference electrodes were found occasionally to disintegrate. Silver deposited on the electrode and was stripped as the potential was scanned oxidatively. Because of the fragility of the silver reference electrodes and concerns about destroying the also fragile calomel reference electrodes, a platinum/platinum oxide quasireference electrode was used in all of the later studies. It is noted that the reference potential of the platinum/platinum oxide quasireference was not always stable to sonication as the oxide layer was sometimes removed from the quasireference during sonication. This resulted in shifts of the voltammograms along the potential axis. The voltage increment was, however, unchanged so that a difference in potential within a voltammogram is a valid measurement. A shift in quasireference potential is apparent in, for example, FIG. 7.

1.6 General Measurement Protocol

The steps in the electrochemical protocol include preparation of the electrode surface and subsequent and electrochemical scans.

1.6.1 Preparation of System

Prior to every experiment, the cell was cleaned with nitric acid and rinsed with Millipore treated water. Platinum electrodes were soaked in concentrated nitric acid and rinsed with deionized water (Milli Q). Silver/silver oxide reference electrodes were also regenerated with concentrated nitric acid. Prior to loading the system with solution, the acoustic system was started and checked for appropriate frequency and amplitude potential. The function generator was then turned off and solution was placed in the well forming a meniscus arching across the top of the well. Once solution was added to the cell, the bulk solution temperature was taken with a Fluke 62 Mini Infrared Thermometer. The temperature of the electrolyte did not change over the course of the experiment within the uncertainty of the infrared thermometer.

1.6.2 Electrochemical Scans

Potential sweeps were preceded by 5 second hold at the initial potential. Data were saved to a hard disk after each scan, after which acoustic settings were adjusted as individual experimental protocol required. Scans were typically conducted in sets of three to five for each sonication setting. Scan rates were typically set at 50 or 100 mV/s.

1.6.3 Maintenance

Electrical connections (e.g., alligator clips connecting the electrodes to the electrochemical analyzer) were regularly sanded and occasionally replaced to reduce electrical resistance. The transducer was replaced when inconsistent results were obtained.

Example 2: Effect of Low Intensity Sonication in a Thin Layer on Heterogeneous Electron Transfer Kinetics ($Fe^{3+}$)

In this Example, it was demonstrated that the application of acoustic energy to thin layer electrochemical systems increased the standard heterogeneous electron transfer rate, $k^0$. This is the rate of electron transfer between the electrode and a redox species in solution at the electrode surface.

Simple heterogeneous electrochemical reactions at an electrode have two components: mass transport where the reactant moves to the electrode surface and product moves away and electron transfer where an electron is transferred across the electrode solution interface between the electrode and the substrate that is at the electrode surface. Heterogenous electron transfer is illustrated in FIG. 6.

In this Example, two one electron transfer probes were compared; one with a fast (reversible) heterogeneous electron transfer rate and one with an electron transfer rate comparable to the rate of cyclic voltammetric voltage perturbation (quasireversible).

Tris(2,2'-bipyridyl)ruthenium(II)chloride hexahydrate, $Ru(bpy)_3^{2+}$ (Sigma-Aldrich) is a classic example of an outer sphere redox probe with fast heterogeneous electron transfer kinetics at platinum electrodes. Outer sphere electron transfers require no structural rearrangement on electron transfer.

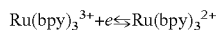

The diffusion coefficient was determined by combination of the cyclic voltammetric scan rate study and a rotating disk voltammetry at different rotation rates. No change in mass transport rate (diffusion coefficient) was found for sonicated and unsonicated systems.

For comparison, ferric ion was chosen because $Fe^{3+}/Fe^{2+}$ is a classic example of a redox couple with slower heterogeneous electron transfer rates at platinum electrodes. The iron couple undergoes near outer sphere electron transfer and is typically regarded as an outer sphere electron transfer process.

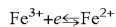

2.1 Sonoelectrochemical Cell with $Ru(bpy)_3^{2+}$ or $Fe^{3+}$

Figure 5:
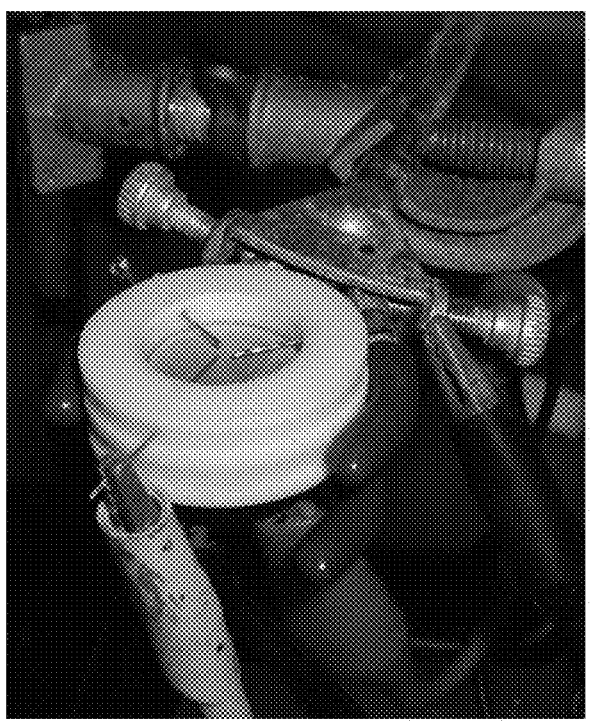
FIG. 5 illustrates for one embodiment a photograph of a second sonoelectrochemical cell in Example 1 constructed with a Teflon sleeve to hold a thin layer of electrolyte above the transducer and around the wire electrodes. The surface of the transducer is the metallic disk seen below the three electrodes where the three electrodes are separated by 120 degrees and pointed toward the center. All electrodes are composed of platinum wire. The transducer is not in electrical contact with the electrodes.

Electrochemical Cell: A second configuration or generation sonoelectrochemical cell (Teflon) as shown in FIG. 5 was cleaned with concentrated nitric acid (Fisher Scientific) and deionized water (Millipore Model Milli Q plus 18.2 MΩ). Unless otherwise noted, a nitrogen blanket was set up to surround the sonoelectochemical cell.

Working and Counter Electrodes: The working and counter electrodes consisted of 0.5 mm platinum wire (Sigma-Aldrich) inserted 8 mm into the solution. Prior to use, the electrode was immersed in concentrated nitric acid (Fisher Scientific) for four minutes and rinsed in deionized water (Millipore Model Milli Q plus 18.2 MΩ).

Reference Electrodes: The quasireference electrode used with the $Ru(bpy)_3^{2+}$ solution was a silver/silver oxide electrode constructed from 0.5 mm silver wire (Sigma-Aldrich) dipped in nitric acid (Fisher Scientific) for 1 minute and rinsed with deionized water (Millipore Model Milli Q plus 18.2 MΩ). The quasireference electrode used with the $Fe^{3+}$ solution consisted of 0.5 mm platinum wire (Sigma-Aldrich) inserted 8 mm into the solution. Prior to use the electrode was immersed in concentrated nitric acid (Fisher Scientific) for four minutes and rinsed in deionized water (Millipore Model Milli Q plus 18.2 M).

Electrolyte: A solution of 0.500 M nitric acid (Fisher Scientific) in deionized water (Millipore Model Milli Q plus 18.2 MΩ) was used as the electrolyte.

Materials: Unless otherwise noted, all chemicals used were obtained by Sigma-Aldrich Chemical Co. and were used as received. Tris(2,2.-bipyridyl)dichlororuthenium(II) hexahydrate ($Ru(bpy)_3^{2+}$) and iron (III) nitrate nonahydrate ($Fe^{3+}$) are commercially available redox probes. A 8.50 mM solution of $Ru(bpy)_3^{2+}$ in 0.500 M nitric acid electrolyte and a 0.500 mM solution of $Fe^{3+}$ in 0.500 M nitric acid electrolyte were used as a redox probes. Unless otherwise noted, all solutions were degassed with nitrogen gas for 15 minutes. 1 mL of either solution was placed in the sonoelectochemical cell well with a disposable pipet creating a meniscus approximately 3 mm above the top of the well.

Sonication: Sound waves were generated in the sonoelectrochemical cell at a frequency of 41 kHz. Unless otherwise noted, intensity was varied from 100% (maximum) down to approximately 30% in roughly 10% increments. Unsonicated scans were run before and after the sonication sets. Peak voltage ($V_p$) of the transducer was monitored with an oscilloscope. Where noted, sonication intensity was set in random order to eliminate bias.

Voltammetry: A BAS 100B Electrochemical Analyzer was used to collect all voltammetry measurements. Voltammograms are recorded at scan rates of 0.05 or 0.1 V/s as noted.

2.2. Voltammetric Results for $Ru(bpy)_3^{2+}$ and $Fe^{3+}$ with and without Sonication 2.2.1 Determination of the Diffusion Coefficient of $Ru(bpy)_3^{2+}$ As described in priority provisional 61/891,727 at pages 56-61 of Duda thesis, which is incorporated herein by reference, the diffusion coefficient of $Ru(bpy)_3^{2+}$ was determined and found to be $(4.5\pm0.1)\times10^{-6}$ cm$^2$/s. This diffusion coefficient was used to determine the electrode area of the sonoelectrochemical cell.

2.2.2 Determination of Electrode Area

As described in priority provisional 61/891,727 at page 61, which is incorporated herein by reference, the electrode area was determined. Physically, the working electrode consists of a piece of 0.5 mm platinum wire that is inserted 8 mm into the solution. The calculated geometric electrode area is 0.13 cm$^2$. The area was also determined electrochemically to produce a measurement of 0.12±0.01 cm$^2$.

2.2.3 $Ru(Bpy)_3^{2+}$ with and without Sonication

A series of cyclic voltammetry scans were run in the sonoelectrochemical cell for 8.50 mM Ru $(bpy)_3^{2+}$ in 0.100 M $HNO_3$. An initial set of three scans is run without sonication, followed by 8 sets of three scans each. The scan sets are separated by approximately 10% increments of sonic intensity and are performed in random order of intensity. A final set of three scans is taken without sonication. Scan rate is 50 mV/s. FIG. 28 of priority provisional application 61/891,727, which is incorporated herein by reference, is a plot showing representative scans, where the scans with and without sonication are the same.

The difference between the potential at peak reduction current and the potential at peak oxidation current, $E_{pred}$ and $E_{pox}$ respectively, often referred to as $\Delta E_p$, is used as a diagnostic of a reversible reaction.

$$\Delta E_p = E_{pred} - E_{pox}$$

$\Delta E_p$ is a function of the switching potential to a minor extent, but $\Delta E_p$ is always close to 2.3 RT/nF or 59/n mV at 25° C. [2]. An average for the sonicated samples produces $\Delta E_p$ of 61±3 mV. The unsonicated samples yield $\Delta E_p$ is 62±3 mV.

This demonstrates that the reaction is reversible and that sonication has little effect on the reaction rate of an already fast electron transfer rate.

A summary of the voltammetric data, $E_{pred}$, $E_{pox}$ and $\Delta E_p$ for various sonication intensities are given in Table 3 of priority provisional 61/891,727

2.2.4 $Fe^{3+}$ with and without Sonication

Figure 7:
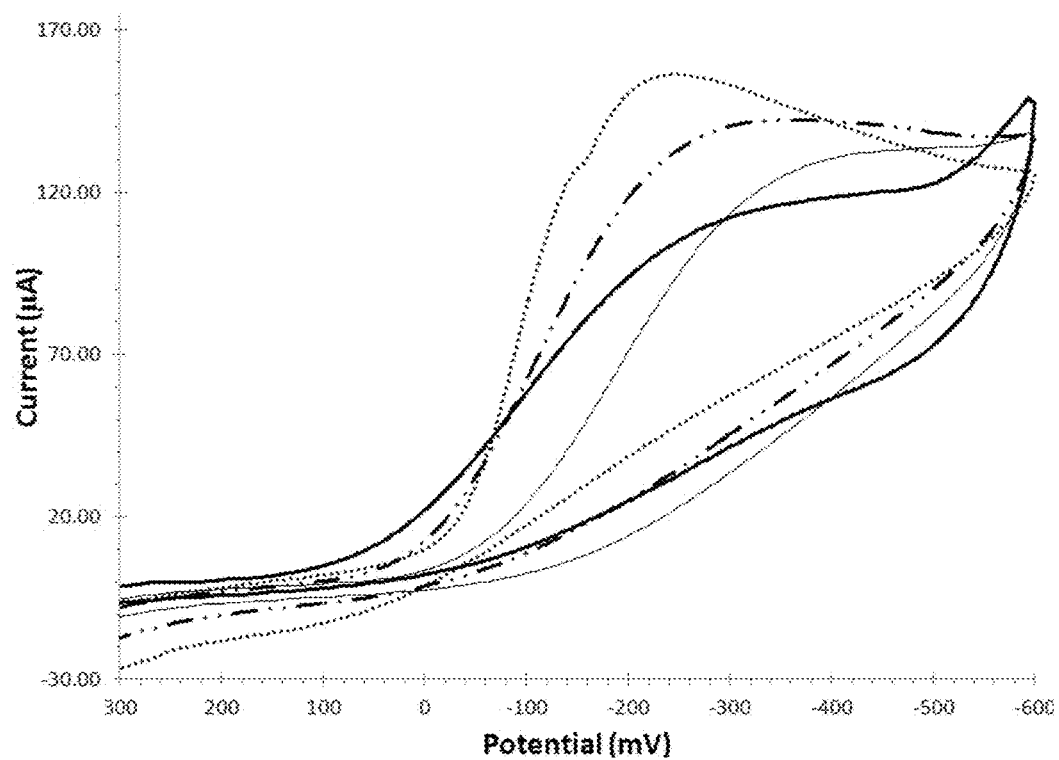
FIG. 7 illustrates from Example 2 for comparison cyclic voltammograms of 5.00 mM $Fe^{3+}$ in 0.500 M nitric acid taken at assorted levels of sonication. Initial Unsonicated (heavy solid); Sonicated maximum intensity (dotted); Sonicated, 30% intensity (dashed); Final Unsonicated (light solid). These data show that the rate of electron transfer increases with sonication intensity as shown by the increase in rising slope (d current/d potential) and that the effect of sonication can persist after the transducer is stopped (final unsonicated as compared to initial unsonicated).
Figure 8:
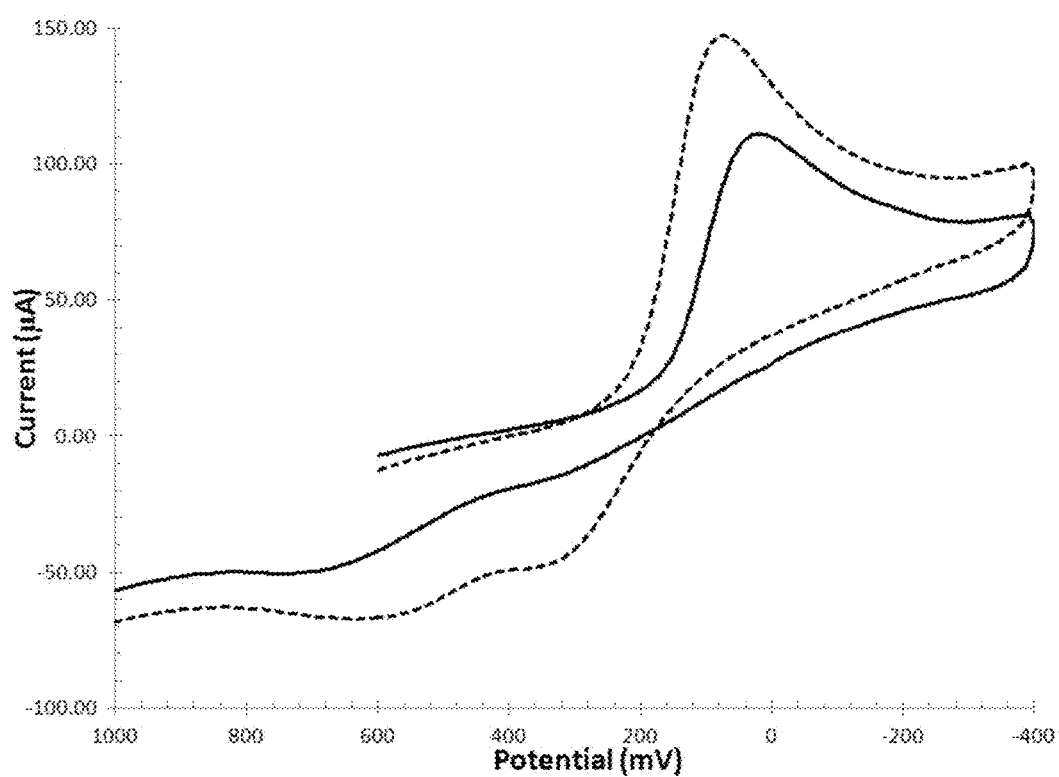
FIG. 8 illustrates from Example 2 for comparison cyclic voltammograms of 5.00 mM $Fe^{3+}$ in 0.500 M nitric acid with reverse scan extended to show backwave. Performed with and without sonication. Solution was degassed with $N_2$ and run under a nitrogen blanket. Unsonicated (solid); Sonicated (dashed). The reaction mechanism is affected by sonication as shown by the more easily oxidized species found with sonication (at about 300 mV). The forward scan again illustrates faster heterogeneous electron transfer kinetics with sonication.

A second series of cyclic voltammetry scans were run in the sonoelectrochemical cell with a 5.00 mM $Fe^{3+}$ in 0.500 M nitric acid electrolyte. An initial set of three scans were run without sonication, followed by 7 sets of three scans each at assorted levels of sonic intensity. The scans were separated by approximately 10% increments of sonic intensity and performed in random order. A final set of three scans was taken without sonication. The scan rate was 100 mV/s. FIG. 7 is a plot of representative scans. FIG. 8, which shows the reverse wave, was taken from another set under similar conditions (sonicated and unsonicated). The increase in the slope of the reductive waves between 0 and −200 mV between sonicated and unsonicated scans in FIG. 7 indicates increased heterogenous electron transfer kinetics with increased sonic intensity. The difference in the slope of the reductive waves between 0 and −200 mV between the unsonicated scans (before and after sonication) indicate that the increased heterogenous electron transfer kinetic persist after sonication, possibly due to changes in the electrode surface. The post-sonication voltammogram eventually returns to the pre-sonication wave form as the electrode surface returns to its pre-sonication state.

The data of Example 2, in sum, show that the rate of heterogeneous electron transfer for ferric ion is dramatically increased with sonic intensity. Further description and discussion is provided in priority provisional application 61/891,727 at pages 75-85 of Duda thesis, which is incorporated herein by reference.

Two points include: (1) the rate of mass transport is not changed in the thin layer sonoelectrochemical cell with and without sonication, and (2) if the rate of heterogeneous electron transfer is already rapid (mass transport limited, reversible), then the rate is not increased; but if the rate of heterogeneous electron transfer is slow, sonication can increase the rate of heterogeneous electron transfer.

Example 3: Impact of Low Intensity Sonication in a Thin Layer on the Oxygen Reduction Reaction (ORR) Kinetics 3.1 Introduction The reduction of oxygen is a multistep process that requires four protons and four electrons. See FIG. 9 where the most common mechanism of oxygen reduction reaction (ORR) in acid at platinum electrodes is shown.

The first reduction step is thought to be the slow step kinetically. The slow kinetics of oxygen reduction prevent spontaneous combustion and ensure mitigation of biological damage by reactive oxygen species, but limit performance of air batteries, fuel cells and other power sources. The inherently poor kinetics of oxygen severely limits the efficiency of the electrochemical reactions where oxygen reduction is part of the process. Direct thermal decomposition of oxygen is less selective; but in internal combustion engines, the moving parts limit efficiency to well below the theoretical efficiency of about 40%. The ability to increase the rate of oxygen reduction kinetics in a electrochemical system can improve the efficiency of electrochemical power sources. Because of the high demand for compact power sources, the thin layer sonoelectrochemical cell is appealing.

In this study, acoustic energy is applied to a thin layer electrochemical systems to increase the apparent standard heterogeneous electron transfer rate, $k^0$, of the reduction of oxygen. Molecular oxygen is used as a sonoelectrochemical probe where $O_2$ is saturated in solution.

3.2 Experimental

Electrochemical Cell: A second generation sonoelectrochemical cell as described in Example 1 is cleaned with concentrated nitric acid (Fisher Scientific) and deionized water (Millipore Model Milli Q plus 18.2 MΩ).

Working and Counter Electrodes: The working and counter electrodes consisted of 0.5 mm platinum wire (Sigma-Aldrich) inserted 8 mm into the solution. Prior to use the electrode is immersed in concentrated nitric acid (Fisher Scientific) for four minutes and rinsed in deionized water (Millipore Model Milli Q plus 18.2MΩ).

Reference Electrode: The reference electrode consists of a silver/silver oxide electrode constructed from 0.5 mm silver wire (Aldrich) dipped in nitric acid (Fisher Scientific) for 1 minute and rinsed with deionized water (Millipore Model Milli Q plus 18.2 MΩ).

Electrolyte: A solution of 0.100 M nitric acid (Fisher Scientific) in deionized water (Millipore Model Milli Q plus 18.2 MΩ) is used as the electrolyte.

Materials: Unless otherwise noted, all chemicals used were obtained from Sigma-Aldrich Chemical Co. and were used as received. All solutions are saturated with $O_2$ using a needle based gassing system for 20 minutes. At laboratory temperatures, this created a 0.28 mM solution of oxygen [48]. Saturation was maintained with an oxygen blanket surrounding the sonoelectrochemical cell. 1 mL of solution was placed in the sonoelectrochemical cell well with a disposable pipet creating a meniscus approximately 3 mm above the top of the well.

Sonication: Sound waves are generated in the sonoelectrochemical cell at a frequency of 41 kHz. Unless otherwise noted, intensity was varied from 100% (maximum) down to approximately 40% in roughly 10% increments. Unsonicated scans were run before and after the sonication sets. Peak voltage (Vp) to drive the oscillator was monitored with an oscilloscope. Where noted, sonication intensity was set in random order to eliminate bias.

Voltammerty: A BAS 100B Electrochemical Analyzer is used to collect all voltammetry measurements. Voltammograms are recorded at scan rates of 0.1 V/s.

3.3 Voltammetric Results for $O_2$ with and without Sonication

Figure 10:
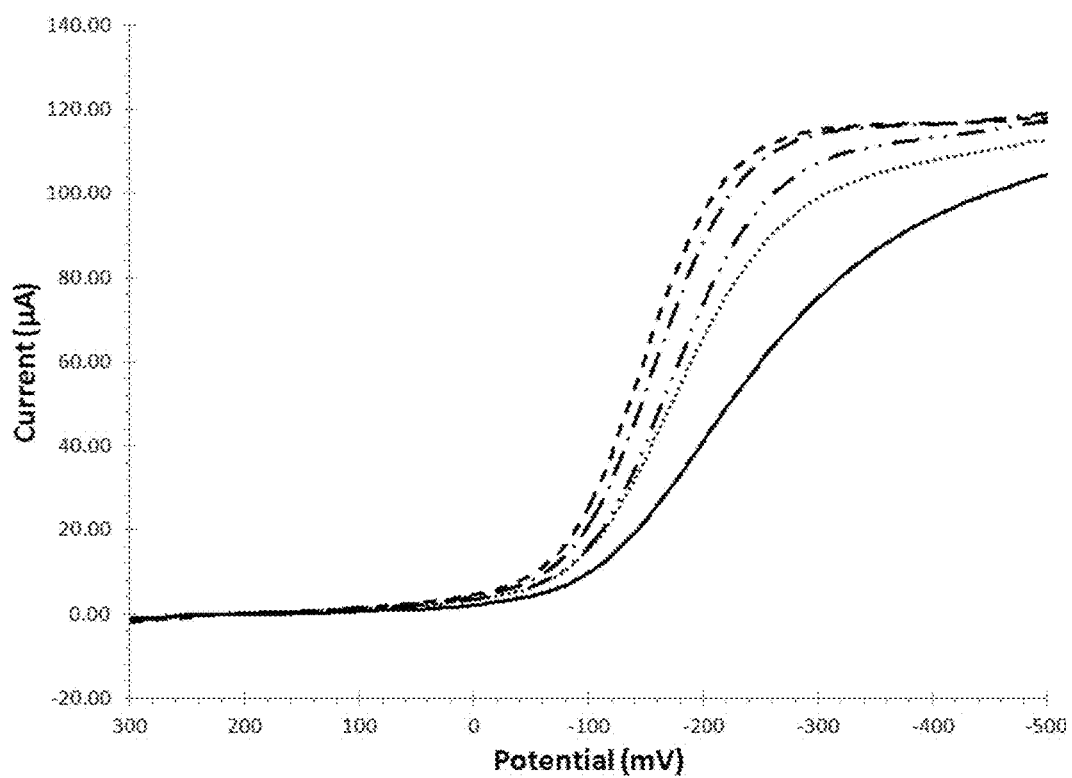
FIG. 10 shows for one embodiment in Example 3 cyclic voltammograms of 0.28 mM $O_2$ in 0.100 M nitric acid taken at assorted levels of sonication for data set 1. Sonicated 100% intensity (dashed); sonicated 80% intensity (dash dot); sonicated 60% intensity (dash dot dot); sonicated 40% intensity (dotted); unsonicated (post sonication) (solid). Scans were taken in the order listed.

Oxygen kinetics were examined. A series of cyclic voltammetric scans was run in the thin layer sonoelectrochemical cell with solutions of 100 mM nitric acid and saturated 0.28 mM $O_2$ at room temperature. An initial set of three scans are run without sonication, followed by 7 sets of three scans each at various intensities of sonication. A set of unsonicated scans are performed after sonication. FIG. 10 is a plot of representative scans. Note that as the intensity increases, the voltammetric wave forms shift to a more erect morphology (d current/d Potential increases) consistent with more rapid kinetics.

Analyses of the oxygen data are performed in the same manner as the ferric ion data, as described in Example 2. An example of this fitting for oxygen is shown in FIG. 49 of priority provisional 61/891,927. The forward scan of the data (from the baseline to $i_{lim}$) is used to fit the model using the Solver tool embedded into Microsoft Office Excel. A chi-square comparison of the data and the model was generated using initial guesses for $i_0/i_{lim}$, $\alpha$ and $E^{0'}$ in the model. Additional description and discussion is provided in priority provisional 61/891,727 which is incorporated by reference.

Figure 11:
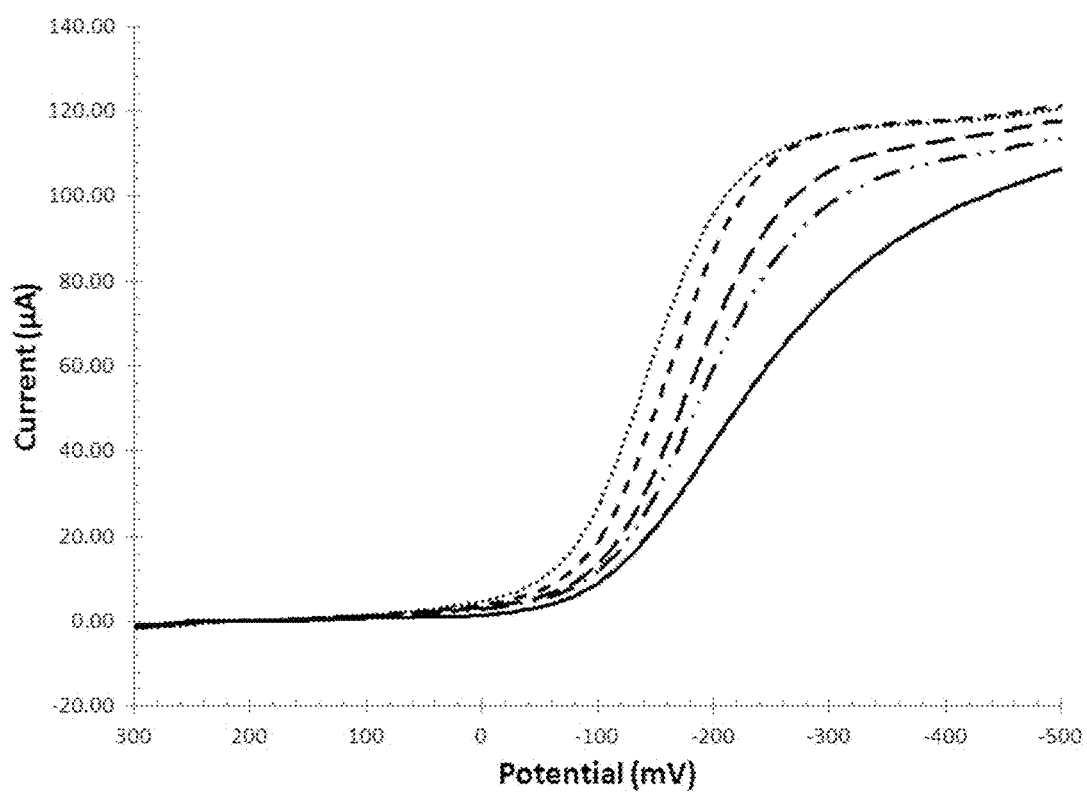
FIG. 11 shows for one embodiment in Example 3 cyclic voltammograms of 0.28 mM $O_2$ in 0.100 M nitric acid taken at assorted levels of sonication for data set 2. Sonicated 100% intensity (dashed); sonicated 80% intensity (dash dot); sonicated 60% intensity (dash dot dot); sonicated 40% intensity (dotted); unsonicated (post sonication) (solid). Scans were taken in the order listed.

FIG. 11 shows a second study of 0.28 mM $O_2$ saturated in 0.100 M nitric acid. At atmospheric pressure and 25° C., the saturated oxygen concentration is known to be 0.28 mM [48]. Values differ slightly between experiments but the general cyclic voltammetric behavior and extracted $k^0$ are the same with increased kinetics at higher transducer intensity. Standard heterogeneous rates at 100% compared to post sonication are increased 30 to 66 fold. On sonication, the transfer coefficient ($\alpha$) increases linearly with intensity which may reflect an increase in temperature at the electrode surface. Under sonication, the transfer coefficient is always greater than the transfer coefficient found without sonication.

3.4 Discussion

Application of ultrasound directly impacts the rate of the oxygen reduction reaction as shown in FIGS. 10 and 11. The data analysis of oxygen reduction is the same as that used in the ferric reduction. In FIGS. 50 and 53 of priority provisional 61/891,727 (which are incorporated by reference), $k^0$ is plotted against V $\Delta P$, which is directly proportional to intensity, and evaluated in Tables 8 and 9 of priority provisional 61/891,727, which are incorporated herein by reference. The standard heterogenous rate constant, $k^0$ is enhanced as is $k^0$ for ferric ion. In both $O_2$ data sets, the first five sonicated points show little or no increase in the reaction rate; however at 90% intensity the rate begins to increase. The highest applied sonic intensities, $k^0$, of $5.4\ (\pm0.1)\times10^{-4}$ and $2.4\ (\pm0.1)\times10^{-4}$ cm/s are approximately 66 fold higher than the unsonicated solution in the first data set and approximately 30 fold in the second data set.

In FIGS. 51 and 54 of priority provisional 61/891,727, which are incorporated herein by reference, $\alpha$ is shown as a function of V $\Delta P$ proportional to intensity. The transfer coefficient, $\alpha$, which gradually increases with V $\Delta P$ is from 0.46 and 0.38 (data sets 1 and 2, respectively) for the unsonicated system and ranges from 0.51 to 0.77 for the sonicated system in both data sets. The transfer coefficient, $\alpha$, increases with increased sonic intensity in both sets.

Visual inspection of the cyclic voltammogram identifies the waves as apparently reversible rapid electron transfer according to Tomes criteria for a single electron transfer reaction. The values obtained for $k^0$ from the fitting are slightly less than reversible. Neither analysis takes into account the four proton, four electron oxygen reduction process so that energy dispersed over multiple steps may not be well accounted for in the two simple models. However, the cyclic voltammetric morphology is consistent with dramatic increases in overall oxygen reduction reaction.

The rate limiting step is considered to be the first electron transfer, and once that is sped up, another step becomes rate limiting. Other potential rate limiting steps include any of the other three electron transfers, any of the proton transfers as well as the adsorption/desorption at the hydrogen peroxide step. The new rate limiting step may or may not be subject to the same degree of acoustic manipulation. At this point there is not enough information to determine how the acoustic energy is dispersed throughout the reaction.

Example 4: Impact of Low Intensity Sonication in a Thin Layer on the Oxygen Reduction Reaction (ORR) Kinetics as a Function of Oxygen Concentration Introduction:

The magnitude of the current signal for oxygen reduction reaction should increase in proportion to the concentration of oxygen in the solution. Further, the rise of the current with voltage should increase with increase in the interfacial reaction rate. In this Example, the current was shown to increase with oxygen concentration, where the concentration was established as near 0 mM for nitrogen degassed systems, near 0.06 mM for ambient air, and near 0.28 mM for saturated oxygen. The cells were degassed with nitrogen or oxygen where appropriate. All measurements were made under a blanket of gas of the same composition: nitrogen, air, or oxygen.

Experimental and Results

Oxygen concentration is established as near 0 mM for nitrogen degassed systems, near 0.06 mM for ambient air, and near 0.28 mM for saturated oxygen. The cells were degassed with nitrogen or oxygen where appropriate. All measurements were made under a blanket of gas of the same composition: nitrogen, air, or oxygen. Data were collected in the cell shown in FIG. 5. The electrolyte was 0.1 M $HClO_4$ (perchloric acid).

Prior to use, the platinum wire electrodes were lightly sanded with fine-grit sandpaper and soaked in concentrated nitric acid for 5 minutes. They were then rinsed three times with high purity deionized water. The thin layer cell consisted of three electrodes. 0.5 mm diameter platinum wires served as working, counter, and reference electrodes.

The degassed solution was sparged with $N_2$ gas for greater than 15 minutes prior to use, and voltammetry was conducted under a nitrogen envelope for the duration of the experiment. Cyclic voltammograms were taken at 200 mV/s between 1.7 V and −1.5 V.

The ambient data were collected without any sparging of the solution, and voltammetry was run without the use of a gas envelope but taken in the open air. Cyclic voltammograms were taken at 200 mV/s between 1.8 V and −1.8 V.

In the data for oxygen saturation, the solution was sparged with $O_2$ for greater than 15 minutes prior to use, and voltammetry was conducted under an oxygen envelope for the duration of the experiment. Cyclic voltammograms were taken at 200 mV/s between 1.2 V and −1.2 V.

All sonications were run at 100% of the maximum intensity for the transducer. All experiments were conducted between 20° C. and 25° C.

Figure 18:
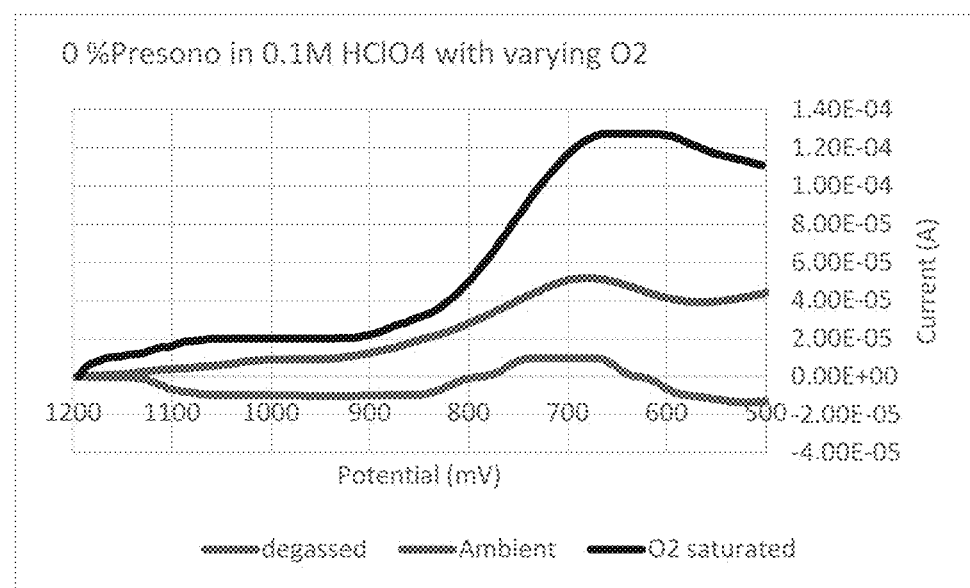
FIG. 18 from Example 4 shows 0% (pre-sonocation) in 0.1 M $HClO_4$ with varying $O_2$ concentrations.
Figure 19:
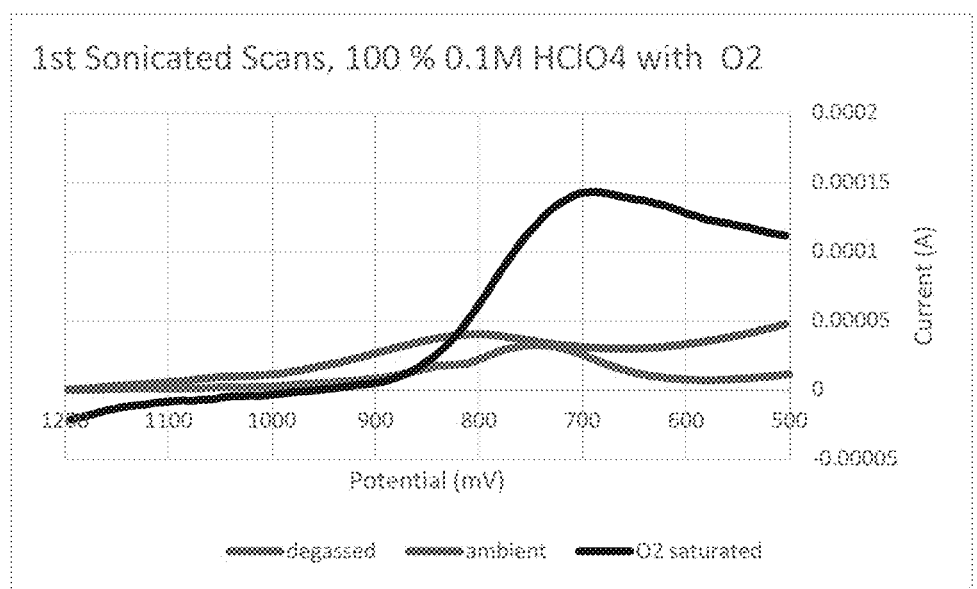
FIG. 19 from Example 4 shows first sonicated scans, 100% 0.1M $HClO_4$ with varying $O_2$ concentrations.

Discussion:

Linear sweep voltammograms are shown in FIGS. 18 and 19 for the three oxygen concentrations with (100%) and without (0%) sonication. The oxygen reduction peak increases with oxygen concentration. The peak current for the ambient oxygen is about 20% of the peak for saturated oxygen. A small current is found for the nitrogen degassed solution and may represent residual oxygen in the electrolyte.

The slope of the rising portion of the oxygen reduction wave is steeper for the sonicated (100%) electrodes than for the unsonicated (0%) electrodes.

In the voltammetric response with and without sonication, current increases the oxygen concentration. On sonication, the rate of the oxygen reduction reaction is higher with sonication than without.

Example 5: Impact of Low Intensity Sonication in a Thin Layer on the Oxide Layer of Platinum Introduction Platinum forms an oxide layer that can promote catalysis, but more generally slows heterogeneous electron transfer reactions and reduces electrocatalytic efficiency. There are several possible ways by which sonication in a thin layer can increase rates of interfacial electron transfer. One way is by removal of the oxide layer on the electrode. Oxide layers are not unique to platinum. Here, data for platinum are presented that demonstrate oxide removal on sonication.

Experimental and Results

A series of cyclic voltammetric scans were run in the sonoelectrochemical cell with 0.100 M nitric acid solution. An initial set of fifty scans were run without sonication. This was followed by 4 sets of 10 scans under sonication with intensity varied from 100% (maximum) down to approximately 40% in roughly 20% increments. A final set of 10 scans were taken without sonication immediately thereafter.

From the data, the oxide peak diminishes with scan number (time) and ultrasonic intensity. In FIGS. 42 through 46 of priority provisional 61/891,727, which are incorporated herein by reference, the effect of sonication on the platinum oxide wave was shown. In FIG. 42, the platinum oxide wave was shown to decrease with time of sonication at 80% intensity. A comparable result for 100% intensity was shown in FIG. 46. FIG. 43 illustrated the decrease in platinum oxide peak current with cyclic voltammetric sweep number (time) for sonication at various intensities. In FIG. 43, the smallest platinum oxide reduction current was found for 100% intensity. FIG. 44 recorded linear sweep voltammograms for the reduction of platinum oxide at a fixed time after starting to successive voltammetric sweeps for various intensities. Peak currents measured from background diminish with intensity. Note the potential of the reference is also shifting with sonication as the oxide layer is removed from the quasireference; it is the platinum|platinum oxide interface that sets the potential of the quasireference. In FIG. 45, the decrease in platinum oxide peak current with sonication intensity (V∆P) is shown. At 100% intensity, the platinum oxide wave was decreased by 80% from the data collected at 40% intensity.

Discussion

Removal of the oxide layer from an electrode can activate the electrode to increase electrocatalytic rates. Here, it was demonstrated that the oxide layer was removed on sonication. This may contribute to some of the observed increases in current found for methanol and the increases in heterogeneous reaction rates for iron(III) and oxygen. The rate of oxide removal will likely increase with higher intensity sonication. Oxide removal may be possible for other electrode materials as is the possibility of activation of numerous electron conductors passivated by an oxide or other passivating layer.

Example 6: Impact of Low Intensity Sonication in a Thin Layer on Methanol Kinetics 6.1 Introduction In these working examples, there is evidence that sonication impacts reaction kinetics at electrode surfaces. For the simple but slow heterogeneous electron transfer processes of iron, the rates are improved. For the more complex multielectron transfer to oxygen, there is an observed increase in the apparent standard heterogeneous rate constant and transfer coefficient. For the oxygen electron transfer process, the first step is the slow step but there are subsequently three additional electron transfer processes. Once the first step is made rapid by ultrasound, the limitations in rate may be associated with the subsequent and following steps.

In their current embodiment, PEM fuel cells work well on hydrogen as a fuel and oxygen or air as the oxidant in a hydrogen-oxygen PEM fuel cell. The rate determining kinetics are at the oxygen electrode. In operational hydrogen oxygen fuel cell, 30% of the theoretical power and energy is lost to poor oxygen kinetics. The data presented here for the increase in oxygen reduction rate are attractive as a means to improve hydrogen oxygen fuel cell performance at low temperatures. A second difficulty with extant fuel cell technology is that hydrogen is difficult to store and costly to harvest. If hydrogen is generated by electrolysis, there is the same tax of the poor oxygen reduction kinetics. Again, the oxygen results indicate that sonoelectrochemistry may be a means to improve the efficiency of both electrolysis and hydrogen oxygen fuel cells.

The most readily commercialized fuel cells will use a liquid fuel, such as alcohols and hydrocarbons. Liquid fuels provide high energy density, ease of transport, safety, and low cost. In the current technology for liquid fed, direct reformation fuel cells, catalyst loadings are 10 times higher than in hydrogen oxygen fuel cells and the power output is 1/10 that of hydrogen oxygen fuel cells. This means that currently, low temperature direct reformation PEM fuel cells are only 1% as efficient as hydrogen oxygen fuel cells. Complexities for fuel cells run on organic fuels include carbon monoxide poisoning of the noble metal catalysts as well as deposition of partial oxidation products across the electrode surface; both passivated the electrode.

The thermodynamic potential for methanol oxidation to $CO_2$ lies close to the equilibrium potential of hydrogen: [53]

$$CH_3OH+H_2O \rightarrow CO_2+6H^++6e^- \quad E^0=0.02V$$

The total oxidation process consists of parallel reactions that can be summarized as [54]:

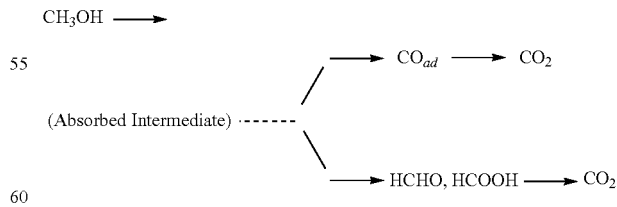

Both pathways require a catalyst to dissociate the C—H bond and complete the reaction of the residue with an oxygen containing species. The final products of the chemisorption process that are thought to result in passivation and poisoning of the noble metal electrode are COH and singly or multiply bonded $CO_{ads}$ [46]. These steps in the oxidation of methanol are the largest impediment to the realization of a direct methanol fuel cell (DMFC) because of poisoning of electrocatalyst.

The thin layer sonoelectrochemistry system may provide a means to better direct reformation systems. Sonication can remove deposited byproducts. Thin layer sonoelectrochemistry has been shown to improve oxygen reduction kinetics. As an initial evaluation of whether a direct reformation fuel cell under sonication would be effective, sonoelectrochemistry of methanol was undertaken. Here, the outcome of that initial screening is presented. Sonoelectrochemistry allows more effective oxidation of methanol. The outcome suggests that a direct reformation fuel cell system that uses a liquid fuel may be viable under sonication.

6.2 Experimental

Electrochemical Cell: A second generation sonoelectrochemical cell as described in Example 1 was cleaned with concentrated nitric acid (Fisher Scientific) and deionized water (Millipore Model Milli Q plus 18.2 MΩ).

Working, Counter and Reference Electrodes: The working and counter electrodes consisted of 0.5 mm platinum wire (Sigma-Aldrich) inserted 8 mm into the solution. Prior to use the electrode is immersed in concentrated nitric acid (Fisher Scientific) for four minutes and rinsed in deionized water (Millipore Model Milli Q plus 18.2 MΩ).

Electrolyte: A solution of 0.100 M nitric acid (Fisher Scientific) in deionized water (Millipore Model Milli Q plus 18.2 MD) was used as the electrolyte.

Materials: Unless otherwise noted, all chemicals used were obtained from Sigma-Aldrich Chemical Co. and were used as received. A 50% (v/v) solution of methanol and 0.100 M nitric acid electrolyte is used. 1 mL of solution was placed in the sonoelectochemical cell well with a disposable pipet.

Sonication: Sound waves are generated in the sonoelectrochemical cell at a frequency of 41 kHz. Intensity was varied from 100% (maximum) down to approximately 40% in roughly 10% increments. Unsonicated scans were run before and after the sonication sets. Peak voltage (Vp) for the oscillator was monitored with an oscilloscope.

Voltammetry: A BAS 100B Electrochemical Analyzer is used to collect all voltammetry measurements. Voltammograms are recorded at scan rates of 0.1 V/s.

6.3 Results and Discussion

The 50% (v/v) methanol solution is approximately correct for appropriate stoichiometry for oxidation of methanol to carbon dioxide, as above. The methanol concentration used in these studies was high. Most direct reformation systems are run on 1 to 2 molar methanol in water. However, the efficacy of sonication at these high concentrations is apparent.

Figure 12:
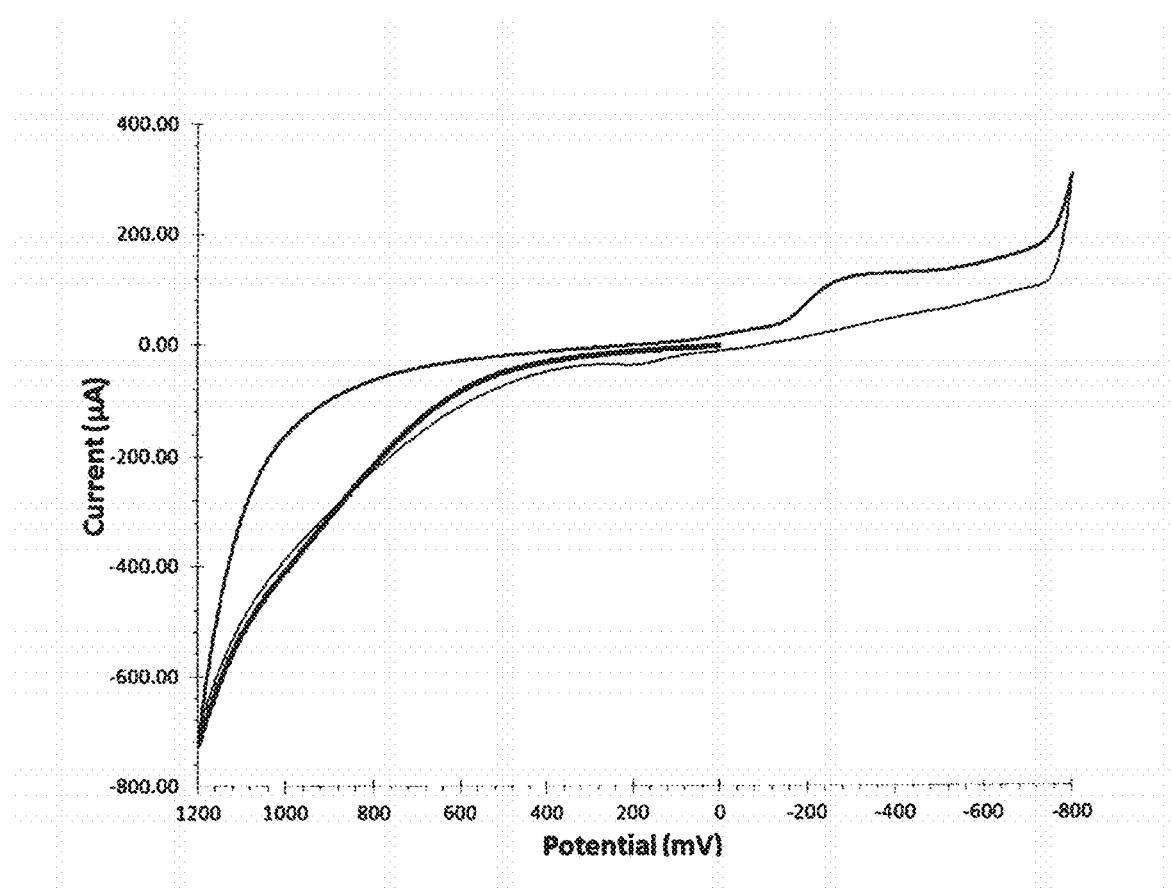
FIG. 12 shows for one embodiment in Example 6 cyclic voltammetric scans of 50% (v/v) methanol/water mixture, unsonicated. Three sweeps are run sequentially without pause in the following order: 0 to 1200 mV (heavy solid); 1200 to −800 mV (medium solid): −800 to 1200 mV (light solid).

Cyclic voltammetry for a platinum electrode without sonication is shown in FIG. 12. There is a reduction current at about −400 mV and a shoulder oxidation at +800 mV, but the electrolysis efficiency for methanol is poor.

Figure 13:
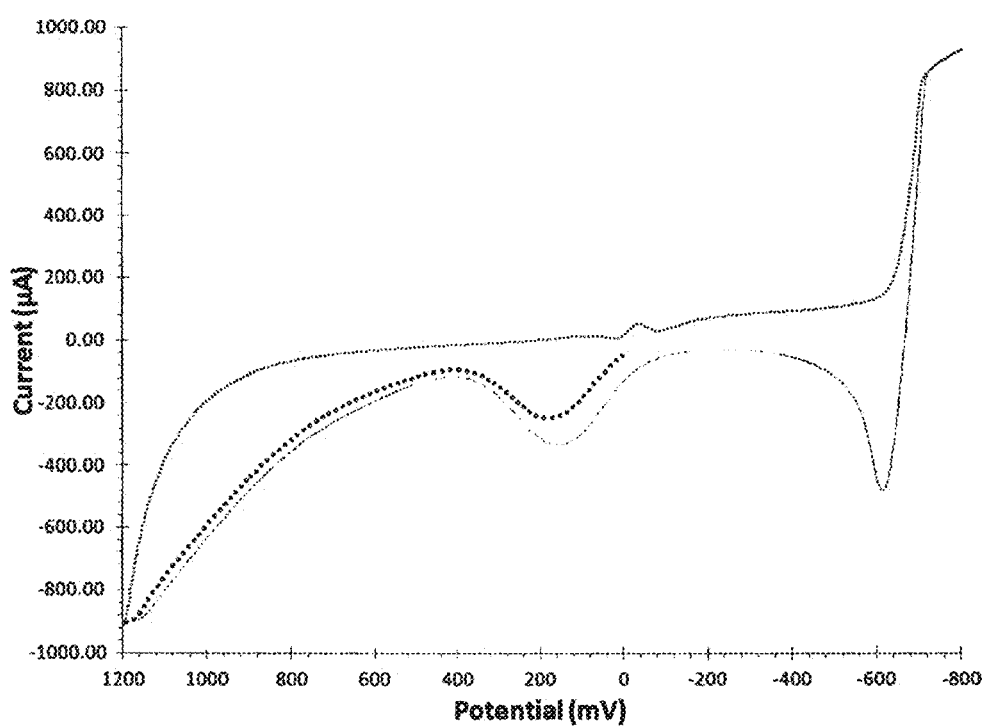
FIG. 13 shows for one embodiment in Example 6 cyclic voltammetric scans of 50% (v/v) methanol/water mixture sonicated at 50% intensity. Three sweeps are run sequentially without pause in the following order: 0 to 1200 mV (heavy dotted); 1200 to −800 mV (medium dotted): −800 to 1200 mV (light dotted).

In FIG. 13, cyclic voltammetry is shown for a sonicated platinum electrode where the intensity of the sonication is half maximum intensity, 50%. There was prior, more intense sonication of the electrode before this voltammogram was recorded. It is apparent from this voltammogram that sonication allows an increase in the effective methanol electrolysis because an oxidation wave is observed near 200 mV.

Figure 14:
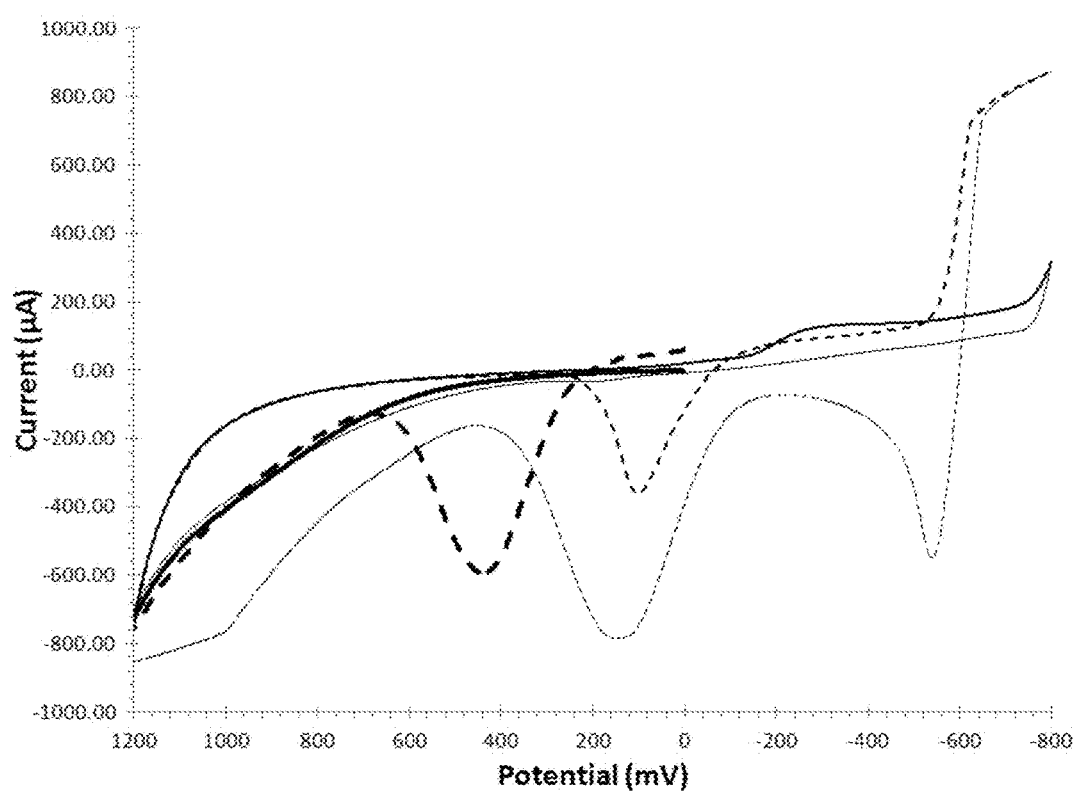
FIG. 14 shows for one embodiment in Example 6 cyclic voltammetric scans of 50% (v/v) methanol/water mixture. Each scan consisted of three sweeps run sequentially without pause in the following order: Unsonicated scan: 0 to 1200 mV (heavy solid); 1200 to −800 mV (medium solid): −800 to 1200 mV (light solid). Sonicated scan (maximum intensity): 0 to 1200 mV (heavy dotted); 1200 to −800 mV (medium dotted): −800 to 1200 mV (light dotted).

In FIG. 14, a cyclic voltammogram is shown for a platinum electrode sonicated at maximum intensity (dashed). This is shown in contrast to the unsonicated methanol cyclic voltammogram (solid). Comparison of the two voltammograms shows a significant increase in the effective methanol electrolysis observed near 200 mV. The full sonic intensity scan starts at 0 V and the potential is increased (left) with no peak at 200 mV, but a symmetric wave at 400 mV. The symmetric wave is likely a stripping wave for the removal of absorbates such as COH and CO. The return scan shows an oxidative peak at 200 mV, which is doubled on the final pass.

FIG. 62 of the priority provisional 61/891,727, which is incorporated herein by reference, shows the peak oxidative currents on the positive sweep of methanol increases with sonic intensity. The data are tabulated in Table 10 of the priority provisional 61/891,727, which is incorporated herein by reference. The increasing current with increasing intensity indicates that the electrolysis reaction is more efficient. The improvement in the poor kinetics of methanol may be the result of an actual improvement in the electron transfer rate or the result of the removal of partial oxidant products form the electrode surface. There is an 80 fold change between the unsonicated peak and the peak a maximum intensity, the peak at 180 mV in FIGS. 12 and 14.

6.4 Conclusion

Initial inspection of methanol electrolysis with and without sonication yields strong evidence that sonication substantially increases the efficiency of methanol electrolysis. Comparison of peak currents at maximum sonication intensity and quiescent shows current at 200 mV is enhanced approximately 80 fold. This suggests that because methanol oxidation is the efficiency limiting process in direct methanol fuel cells (DMFCs), sonication will improve the efficiency of DMFCs substantially. The improvement of oxygen kinetics may also contribute to improved direct reformation PEM fuel cells. A 25 fold enhancement to DMFC efficiency would be about 20% efficiency, an efficiency comparable to most automobiles on the road. The observed 80 fold increase, well above 25 fold, implies the use of sonication allows efficient methanol oxidation which may translate to liquid fuel cells. Further evaluation of methanol electrolysis under sonication is justified.

Figure 20:
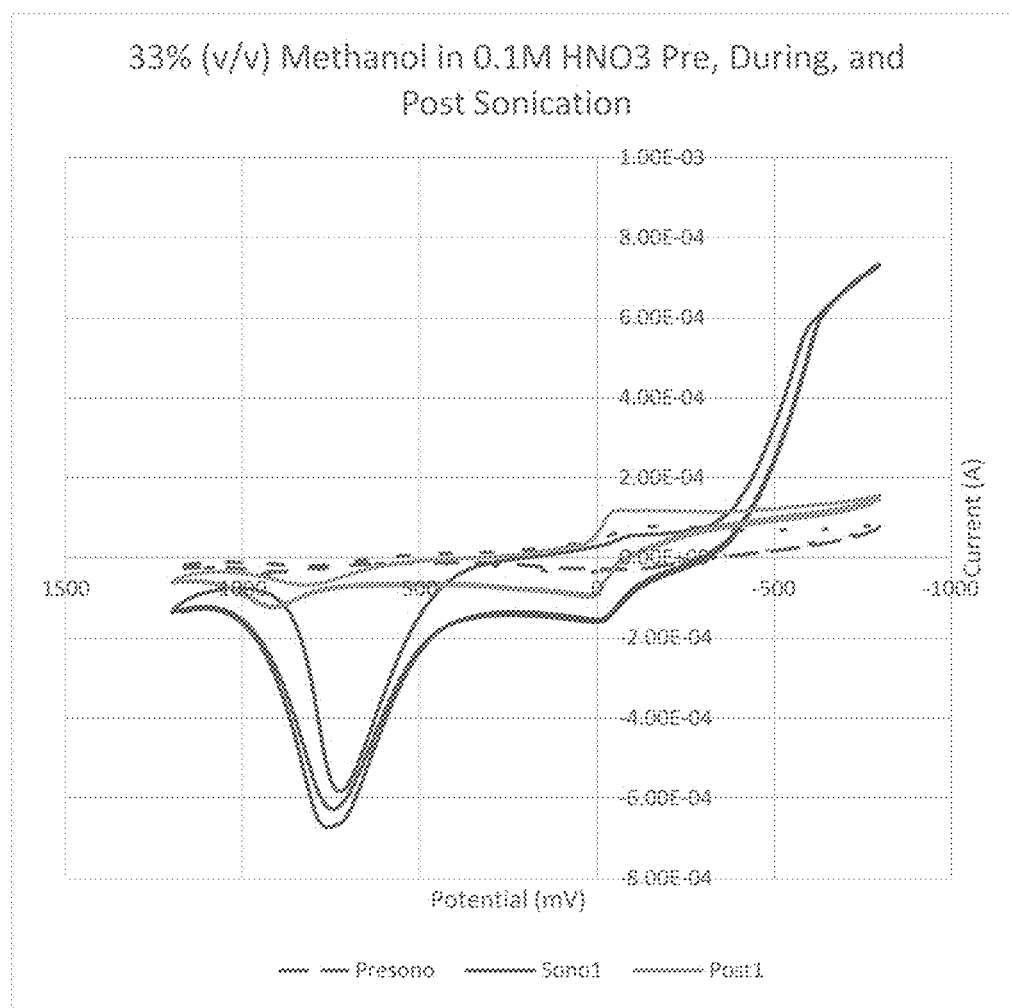
FIG. 20 from Example 7 shows (not degassed) 33% (v/v) methanol in 0.1 M $HNO_3$ pre, during, and post sonication.
Figure 21:
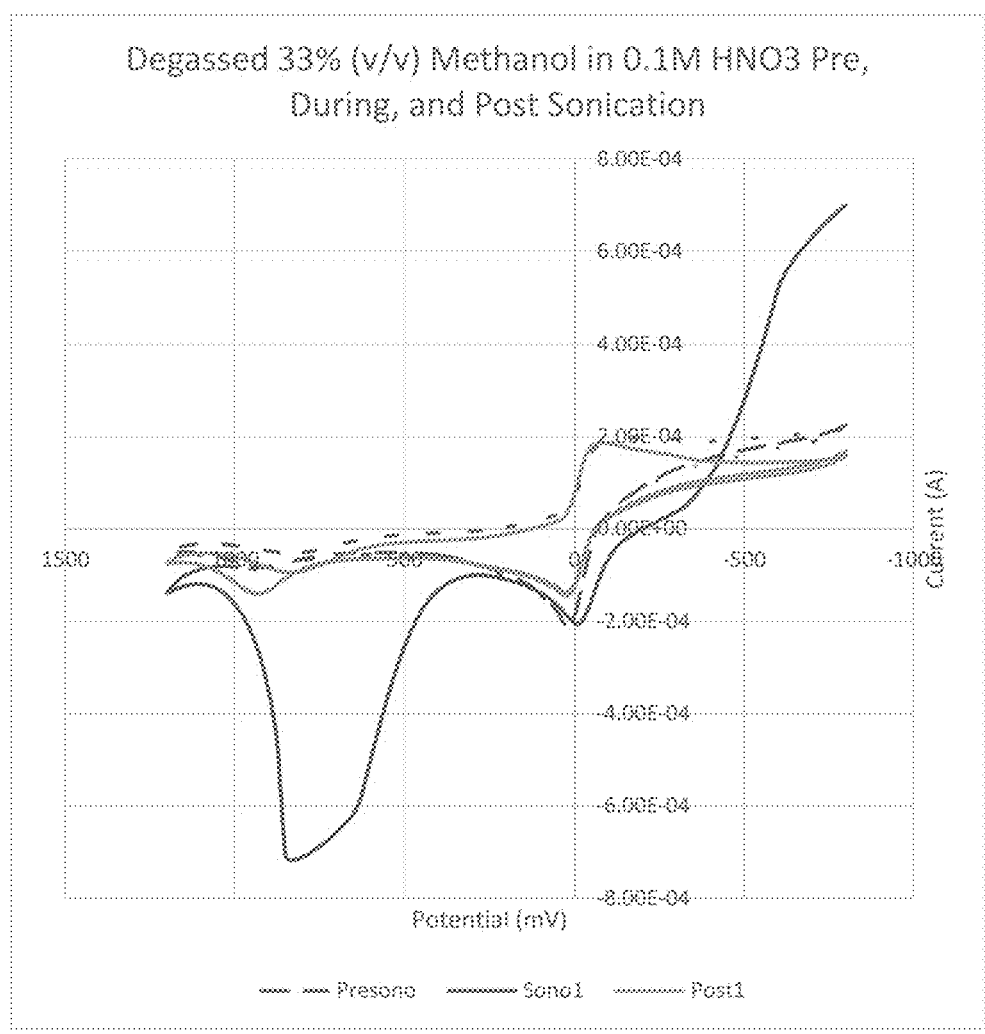
FIG. 21 from Example 7 shows degassed 33% (v/v) methanol in 0.1 M $HNO_3$ pre, during, and post sonication.
Figure 22:
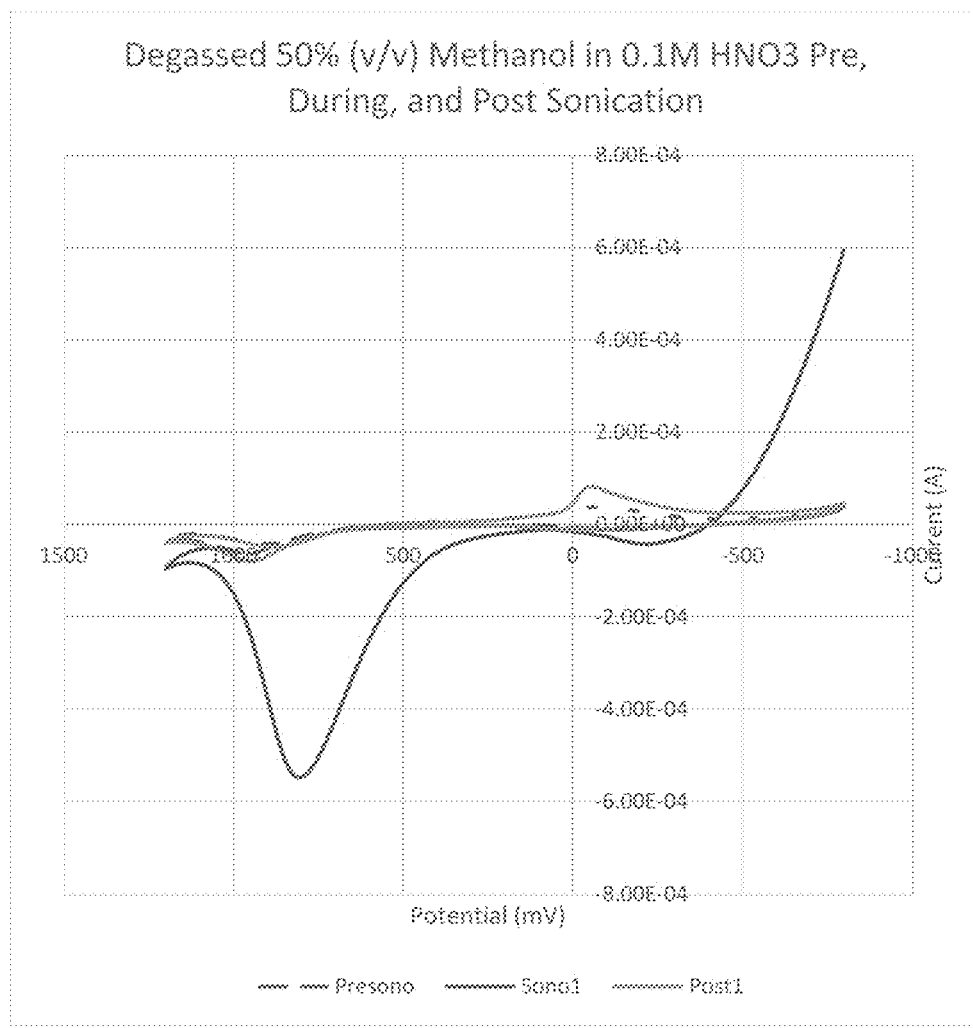
FIG. 22 from Example 7 shows degassed 50% (v/v) methanol in 0.1 M $HNO_3$ pre, during, and post sonication.

Example 7: Impact of Low Intensity Sonication in a Thin Layer on Methanol Kinetics as a Function of Methanol Concentration and Oxygen Introduction As concentration of methanol increases, the passivation of the platinum electrodes by partial oxidation products and carbon monoxide increases. Oxygen in the solution may alter the reaction pathway for methanol oxidation. Here, methanol concentrations of 33% and 50% v:v methanol (8.2 and 12.4 M) in 0.1 M nitric acid were examined with (100%) and without (0%) sonication. See FIGS. 20-22. Solutions are degassed with nitrogen (FIGS. 21, 22). The 33% methanol was also examined without degassing (FIG. 20). It is noted that these concentrations are near the stoichiometric limit. Most studies of methanol cannot be conducted at these high concentrations because passivation renders the electrodes inert.

Experimental and Results

All cyclic voltammograms are shown at 100 mV/s. Potentials are reported relative to the quasi-reference electrode, which may shift potential on ultrasonic irradiation. So, all potentials are relative and may not correlate consistently with the normal hydrogen scale. For experiments on methanol behavior, the voltage window is from +1200 mV to −800 mV. Scans of the electrode are first recorded pre-sonication. The quartz crystal oscillator (41 kHz) is engaged for 5 minutes and cyclic voltammograms are recorded. The quartz crystal oscillator is then turned off and another cyclic voltammogram is immediately recorded; these are post-sonication. Data for the methanol experiments, the $3^{rd}$ scan.

Unless otherwise noted, the electrolyte is degassed, and the experiments are executed under a $N_2$ envelope. To degas the electrolyte, a small aliquot (about 20 mL) of electrolyte is poured into a small beaker. A syringe needle connected to a $N_2$ cylinder is submerged in the electrolyte and gas is flowed into it for a minimum of 10 minutes. To create the nitrogen envelope, the sonoelectrochemical cell is completely encased in a plastic box. Gas is flowed into it for a minimum of 10 minutes prior to beginning voltammetry and continues for the duration of the experiment.

Discussion

From the data for 33% methanol not degassed and degassed (FIGS. 20 and 21, respectively), the voltammograms are similar consistent with no large changes in the reduction mechanism when small amounts of dissolved oxygen are present.

For all data, the pre-sonication and post-sonication responses are similar, so for these studies, continuous sonication is necessary to the observed increases in current for methanol oxidation (near 750 mV) and for the reduction process at negative potentials.

From the data, sonication dramatically increases the methanol oxidation current. With sonication, the methanol oxidation current is ~0.5 mA at a 0.12 $cm^2$ electrode or 4 $mA/cm^2$ at about 750 mV. For the post-sonicated electrodes, the peak is about 150 mV more positive and currents are about 0.05 mA, or compared to the sonicated system, about one tenth the current at a cost of an additional 150 mV of energy. For the pre-sonicated electrodes, the potentials are similar to the post-sonicated electrodes and the currents are the same or smaller than the post sonicated electrodes.

These data illustrate that the sonication is effective in decreasing the impact of passivation of platinum electrocatalytic electrodes and electrocatalysts and allowing the oxidation of methanol. Oxidation of methanol is the rate determining process in direct reformation PEM fuel cells that run on methanol.

REFERENCES

The following references are provided to further enable one skilled in the art to practice, make, and use, the claimed inventions and, in some cases, are also cited to in the application. No admission is made that any of the references are prior art.

[1] Corporation, P. E. Air Ultrasonic Ceramic Transducers 400ET/R180 Specification Sheet.
[2] Bard, A.; Faulkner, L. *Electrochemical Methods*; John Wiley & Sons, Inc.: New York, Second Ed.; 2001.
[3] Mason, T. J. *Sonochemistry: The Uses of Ultrasound in Chemistry*; The Royal Society of Chemistry: Cambridge, 1990.
[4] Suslick, K. S. *Britannica* 2006, http://www.scs.uiuc.edu/suslick/britannica, html.
[5] Suslick, K. S. *The Chemistry and Physical Effects of Ultrasound* 2006, www.scs.uiuc.edu/suslick/britannica, html.
[6] Doktycz, S. J.; Suslick, K. S. *Science* 1990, 247, 1067-1068.
[7] Suslick, K. S.; Didenko, Y.; Fang, M. M.; Hyeon, T.; Kolbeck, K. J.; III, W. B. M.; Mdleleni, M. M.; Wong, M. *Phil. Trans. Roy. Soc. A* 1999.
[8] Suslick, K. S.; John J. Gawlenowski; Schubert, P. F.; Wang, H. H. *J. Phys. Chem.* 1983, 87, 2299-2301.
[9] Suslick, K. S.; Hemmerton, D. A. *IEEE Transactions on Ultrasonics, Ferroelectrics, and Frequency Control* 1986, UFFC-33, 143-147.
[10] Suslick, K. S.; Hammerton, D. A.; Cline, J. R. E. *J. Am. Chem. Soc.* 1986, 108, 5641-5642.
[11] Mason, T. J.; Lorimer, J. P. *Sonochemistry: Theory, Applications and Uses of Ultrasound in Chemistry*; John Wiley & Sons: New York, 1988.
[12] Mason, T. J. *Phil. Trans. R. Soc. Lond. A* 1999, 357, 355-369.
[13] Mason, T. J. *Ultrasonics Sonochemistry* 2003, 10, 176-179.
[14] Lorimer, J. P.; Mason, T. J. *Chem. Soc. Rev.* 1987, 16, 239-274.
[15] Lindley, J.; Mason, T. J. *Chem. Soc. Rev.* 1987, 16, 275-311.
[16] Goh, N. K.; Teoh, A. C. C.; Chia, L. S.; Teo, K. C. *Ultrasonics Sonochemistry* 1996, 3, S209-S214.
[17] Boldyrev, V. V. *Ultrasonics Sonochemistry* 1995, 2, S143-S145.
[18] Riesz, P.; Berdahl, D.; Christman, C. L. *Environmental Health Perspectives* 1985, 64, 233-252.
[19] Riesse, J.; Caulier, T.; Deckerheer, C.; Fabre, O.; Vandercammen, J.; Delplancke, J. L.; Winand, R. *Ultrasonics Sonochemistry* 1996, 3, S147-S151.
[20] Hoffman, M. R.; Hua, I.; Hochemer, R. *Ultrasonics Sonochemistry* 1996, 3, S163-S172.
[21] Margulis, M. A. *High Energy Chemistry* 2004, 38, 135-142.
[22] Thompson, L. H.; Doraiswamy, L. K. *Ind. Eng. Chem. Res.* 1999, 38, 1215-1249.
[23] Zhang, H.; Coury, J. L. A. *Analytical Chemistry* 1993, 65, 1552-1558.
[24] Hagan, C. R. S.; Coury, J. L. A. *Analytical Chemistry* 1994, 66, 399-405.
[25] Madigan, N. A.; Hagan, C. R. S.; Zhang, H.; Coury, J. L. A. *Ultrasonics Sonochemistry* 1996, 3, S239-S247.
[26] Madigan, N. A.; Jr., L. A. C. *Anal. Chem.* 1997, 69, 5-15.
[27] Cooper, E. L.; Jr., L. A. C. *Journal of the Electrochemical Society* 1998, 145, 1994-1999.
[28] Wadhawan, J. D.; Marken, F.; Compton, R. G. *Pure Appl. Chem.* 2001, 73, 1947-1955.
[29] Banks, C. E.; Compton, R. G. *Chem. Phys. Chem.* 2003, 4, 169-178.
[30] Banks, C. E.; Compton, R. G. *Electroanalysis* 2003, 16, 329-346.
[31] Walton, D. J.; Phull, S. S.; Chyla, A.; Lorimer, J. P.; Mason, T. J.; Burke, L. D.; Murphy, M.; Compton, R. G.; Eklund, J. C.; Page, S. D. *Journal of Applied Electrochemistry* 1995, 25, 1083-1090.
[32] Marken, F.; Eklund, J. C.; Compton, R. G. *Journal of Electroanalytical Chemistry* 1995, 395, 335-339.
[33] Cartwright, K. V. *Technology Interface* 2007, 8, 20.
[34] Bies, D. A.; Hansen, C. H. *Engineering Noise Control: Theory and Practice*; Taylor Francis: New York, $4^{th}$ ed.; 2009.
[35] Blauert, J. *Acoustics for Engineers*; TroyLectures Springer-Verlag: Berlin, 2009.
[36] Fahy, F. J. *Sound Intensity*; Elsevier Science Publishers, Ltd.: New York, 1989.
[37] University of New South Wales; School of Physics, *Acoustic impedance, intensity and power* 2011, http://www.animations.physics.unsw.edu.au/jw/sound-impedance-intensity, htm.
[38] Bloemhof, H. *Applied Acoustics* 1986, 19, 159-166.

[39] Davis, J. D.; Patronis, E. *Sound System Engineering*; Elsevier Focal Press: Boston, 3rd ed.; 2006.
[40] Chadderton, D. V. "Building Services Engineering", 2007.
[41] Stokes, G. G. *Trans. Camb. Phil. Soc.* 1849, 8, 287.
[42] Kirchhoff, G. *Ann. Phys. Chem.* 1868, 134, 177.
[43] Bard, A. J.; Faulkner, L. R. *Electrochemical Methods*; John Wiley & Sons, Inc.: New York, 1980.
[44] Hush, N. *Transactions of the Faraday Society* 1961, 57, 557-580.
[45] Lide, D. R. *CRC Handbook of Chemistry and Physics*; CRC Press: New York, 2001.
[46] Wieckowski, A. *Interfacial Electrochemistry*; Marcel-Dekker, Inc.: New York, 1999.
[47] Conway, B. E.; Jerkiewicz, G. *Journal of Electroanalytical Chemistry* 1992, 339, 123-146.
[48] Truesdale, G. A.; Downing, A. L. *Nature* 1954, 173, 1236.
[49] Marcus, R. A. *Journal of Physical Chemistry* 1963, 67, 853-857.
[50] Marcus, R. A. *Journal of Chemical Physics* 1965, 43, 679-701.
[51] Marcus, R. *Electrochim. Acta* 1968, 13, 995-1003.
[52] Miller, J.; Calcaterra, L.; Closs, G. *J. Am. Chem. Soc.* 1984, 106, 3047.
[53] Iwasita, T. *Electrochimica Acta* 2002, 47, 3663-3674.
[54] Breiter, M. *Electrochimica Acta* 1967, 12, 1213-1218.
[55] Mott, N. F. *Trans. Faraday Soc.* 1947, 43, 429-434.
[56] Petersson, F.; Nilsson, A.; Jonsson, H.; Laurell, T. *Anal. Chem.* 2005, 77, 1216-1221.

What is claimed is:

1. A device comprising:
at least one sonoelectrochemical cell comprising cell walls and a containment volume to hold a thin layer of condensed fluid which supports an electron transfer reaction when the thin layer of condensed fluid is disposed in the containment volume,
wherein the cell further comprises an ultrasonic transducer, optionally as an ultrasonic transducer face, to propagate sound waves into the thin layer of condensed fluid when the thin layer of condensed fluid is disposed in the containment volume, and
wherein the cell and the cell walls further comprise an opening to a less dense phase to provide the thin layer of condensed fluid with at least one interface which provides for reflection of the sound waves from the interface back into the thin layer of condensed fluid when the thin layer of condensed fluid is disposed in the containment volume,
wherein the sonoelectrochemical cell comprises a working electrode, a counter electrode, and optionally a reference electrode,
wherein the cell walls and the opening form a well having a top of the well, and when added the thin layer of condensed fluid forms a meniscus arching across the top of the well,
wherein the sonoelectrochemical cell comprises the thin layer of condensed fluid,
wherein the thin layer is 100 mm or less,
wherein the cell is characterized by a cell height which is less than the longest lateral dimension of the cell;
wherein the working electrode extends into the containment volume of the sonoelectrochemical cell; and
wherein the sonoelectrochemical cell in operation increases the rate of the electron transfer reaction in the thin layer of condensed fluid.

2. The device of claim 1, wherein the cell comprises the ultrasonic transducer face, wherein the transducer face forms the bottom of a well, and the wall of the well is a hollow cylinder, wherein the thin layer of condensed fluid rests in the well above the transducer face when the thin layer of condensed fluid is disposed in the containment volume, and the sides of the well support the working electrode and the counter electrode just above and parallel to the transducer face.

3. The device of claim 2, wherein the working electrode and counter electrode are positioned radially between the inner cylinder wall and near the centerpoint of the circular cross section.

4. The device of claim 1, wherein the cell comprises the ultrasonic transducer face, and wherein the working electrode and counter electrode are parallel to the transducer face.

5. The device of claim 1, wherein the transducer avoids turbulence in the thin layer of condensed fluid.

6. The device of claim 1, wherein the transducer is a piezoelectric transducer.

7. The device of claim 1, wherein the transducer is a polymer transducer.

8. The device of claim 1, wherein the transducer is a polyvinylidene difluoride (PVDF) transducer.

9. The device of claim 1, wherein the transducer is a cylindrical transducer.

10. The device of claim 1, wherein the sonelectrochemical cell further comprises a sleeve to form the cell walls and containment volume and hold the thin layer of condensed fluid above the transducer, and the transducer fits in the sleeve snugly enough to secure the transducer in place relative to the sleeve.

11. The device of claim 1, wherein the thin layer of condensed fluid comprises an alcohol and carries out an alcohol oxidation reaction.

12. The device of claim 1, wherein the thin layer of condensed fluid comprises oxygen and carries out an oxygen reduction reaction.

13. The device of claim 1, wherein the electrode is recessed in the cell wall.

14. The device of claim 1, wherein the cell is characterized by a cell height which is less than one-half the longest lateral dimension of the cell.

15. The device of claim 1, wherein the longest lateral dimension of the cell is a diameter.

16. The device of claim 1:
wherein the cell is characterized by a solid reaction surface volume, optionally an electrode volume, and a cell volume, and the solid reaction surface volume, optionally electrode volume, is at least 10% of the cell volume.

17. The device of claim 1:
wherein the cell is characterized by a solid reaction surface area, optionally an electrode surface area, and a transducer face surface area, and the solid reaction surface area, optionally electrode surface area, is at least 10% of the transducer face surface area.

18. The device of claim 1, further comprising an electrode solution interface at which a heterogeneous electron transfer reaction occurs.

19. The device of claim 11, wherein the alcohol is methanol.

* * * * *